(12) United States Patent
Southwell et al.

(10) Patent No.: US 12,401,945 B2
(45) Date of Patent: Aug. 26, 2025

(54) SUBBAND DOMAIN ACOUSTIC ECHO CANCELLER BASED ACOUSTIC STATE ESTIMATOR

(71) Applicant: DOLBY LABORATORIES LICENSING CORPORATION, San Francisco, CA (US)

(72) Inventors: Benjamin John Southwell, Gledswood Hills (AU); David Gunawan, Sydney (AU); Christopher Graham Hines, Sydney (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 274 days.

(21) Appl. No.: 18/255,573

(22) PCT Filed: Dec. 2, 2021

(86) PCT No.: PCT/US2021/061661
§ 371 (c)(1),
(2) Date: Jun. 1, 2023

(87) PCT Pub. No.: WO2022/120085
PCT Pub. Date: Jun. 9, 2022

(65) Prior Publication Data
US 2023/0421952 A1 Dec. 28, 2023

Related U.S. Application Data

(60) Provisional application No. 63/200,590, filed on Mar. 16, 2021, provisional application No. 63/120,824, filed on Dec. 3, 2020.

(30) Foreign Application Priority Data

Mar. 25, 2021 (EP) .................................. 21164808

(51) Int. Cl.
H04R 3/02 (2006.01)

(52) U.S. Cl.
CPC ...................................... H04R 3/02 (2013.01)

(58) Field of Classification Search
CPC ........................................................ H04R 3/02
See application file for complete search history.

(56) References Cited

U.S. PATENT DOCUMENTS 8,259,926 B1   9/2012   Avendano
9,521,249 B1   12/2016  Chhetri
(Continued)

FOREIGN PATENT DOCUMENTS

CN   107749303 A    3/2020
CN   111161748 A1   5/2020
(Continued)

OTHER PUBLICATIONS

Translation of JP 2015019183A (Jan. 29, 2015).*
(Continued)

*Primary Examiner* — Andrew Sniezek

(57) ABSTRACT

Some implementations involve receiving, from a first subband domain acoustic echo canceller (AEC) of a first audio device in an audio environment, first adaptive filter management data from each of a plurality of first adaptive filter management modules, each first adaptive filter management module corresponding to a subband of the first subband domain AEC, each first adaptive filter management module being configured to control a first plurality of adaptive filters. The first plurality of adaptive filters may include at least a first adaptive filter type and a second adaptive filter type. Some implementations involve extracting, from the first adaptive filter management data, a first plurality of extracted features corresponding to a plurality of subbands of the first subband domain AEC and estimating a current (Continued)

local acoustic state based, at least in part, on the first plurality of extracted features.

15 Claims, 17 Drawing Sheets

(56) References Cited

U.S. PATENT DOCUMENTS

| | | |
|---|---|---|
| 9,767,828 B1 | 9/2017 | Velusamy |
| 9,769,587 B2 | 9/2017 | Schevciw |
| 9,947,336 B2 | 4/2018 | Shi |
| 10,074,380 B2 | 9/2018 | Wung |
| 10,090,000 B1 | 10/2018 | Tzirkel-Hancock |
| 10,481,831 B2 | 11/2019 | Schalk-Schupp |
| 10,540,984 B1 | 1/2020 | Malik |
| 10,622,009 B1 | 4/2020 | Zhang |
| 10,827,076 B1 * | 11/2020 | Li ................... H04M 9/082 |
| 11,600,287 B2 * | 3/2023 | Hera .................. G10L 15/20 |
| 2003/0061040 A1 | 3/2003 | Likhachev |
| 2014/0270148 A1 * | 9/2014 | Cleve ............... H04M 3/002 379/406.08 |
| 2016/0275961 A1 | 9/2016 | Yu |
| 2019/0132452 A1 | 5/2019 | Liu |
| 2019/0272843 A1 | 9/2019 | Thorpe |
| 2019/0349471 A1 | 11/2019 | Ferguson |
| 2020/0136675 A1 | 4/2020 | Christoph |
| 2020/0243104 A1 | 7/2020 | Kim |
| 2020/0312344 A1 | 10/2020 | Hera |

FOREIGN PATENT DOCUMENTS

| | | |
|---|---|---|
| JP | 2006319925 A | 11/2006 |
| JP | 2015019183 A | 1/2015 |
| WO | 2019047710 A1 | 3/2019 |

OTHER PUBLICATIONS

Meng Liang et al., Nonlinear Echo Cancellation Based on Polyphase Filter Bank, Asia-Pacific Signal and Information Processing Association Annual Summit and Conference (APSIPA ASC), Nov. 18-21, 2019, 6 pages, Lanzhou, China.

* cited by examiner

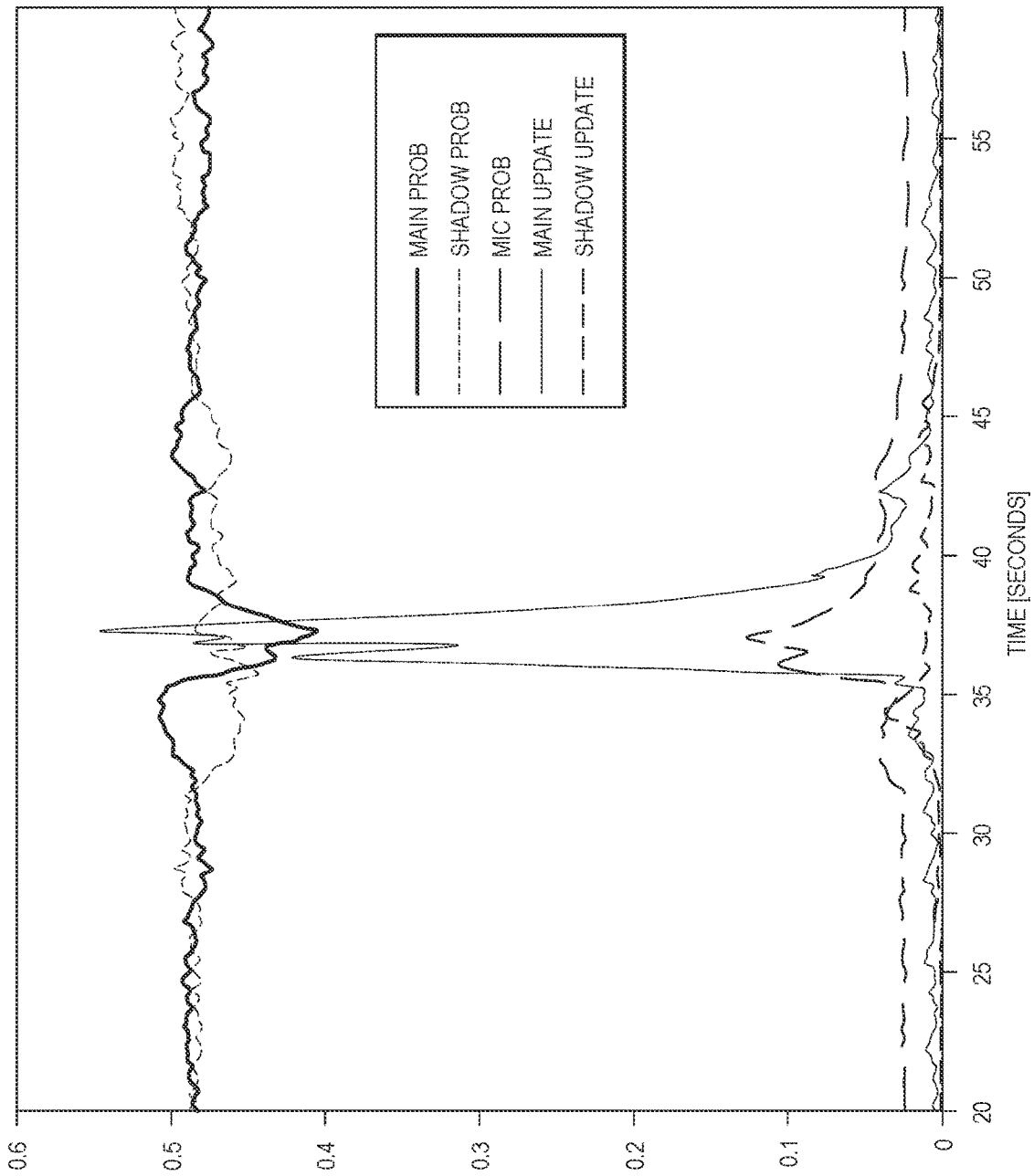

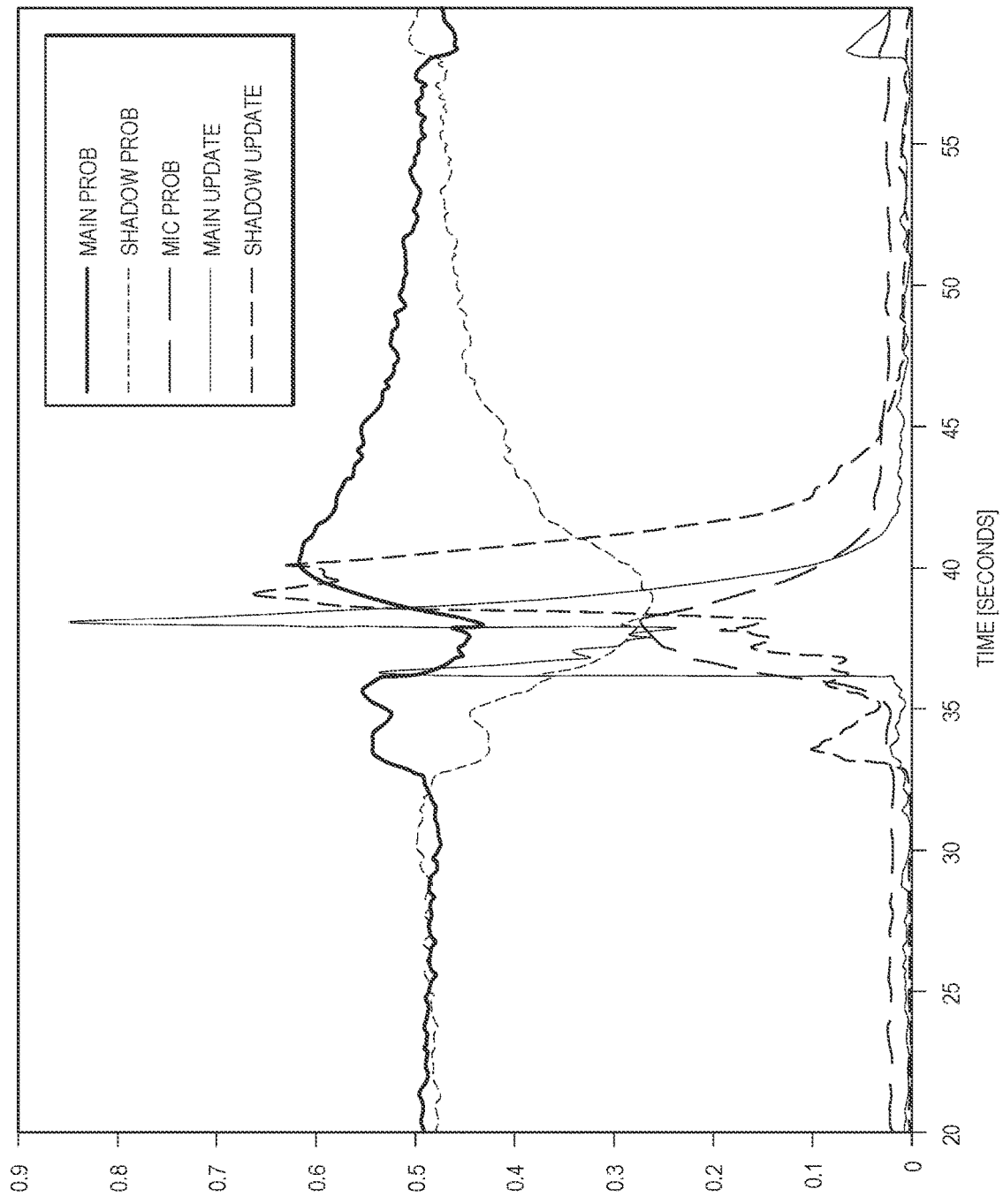

SUBBAND DOMAIN ACOUSTIC ECHO CANCELLER BASED ACOUSTIC STATE ESTIMATOR

CROSS-REFERENCE TO RELATED APPLICATIONS

This application is a U.S. National Stage application under U.S.C. 371 of International Application No. PCT/US2021/061661, filed on 2 Dec. 2021, which claims priority of the following application: U.S. provisional application 63/120,824, filed 3 Dec. 2020, U.S. provisional application 63/200,590, filed 16 Mar. 2021 and European Patent Application No. 21164808.4, filed 25 Mar. 2021, each of which is incorporated by reference in its entirety.

TECHNICAL FIELD

This disclosure pertains to systems and methods for implementing acoustic echo cancellers.

BACKGROUND

Audio devices and systems having acoustic echo cancellers are widely deployed. Although existing systems and methods for implementing acoustic echo cancellers provide benefits, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more audio processing methods. In some instances, the method(s) may be implemented, at least in part, by a control system and/or via instructions (e.g., software) stored on one or more non-transitory media. Some such methods involve receiving, e.g. by a control system, from a first subband domain acoustic echo canceller (AEC) of a first audio device in an audio environment, first adaptive filter management data from each of a plurality of first adaptive filter management modules. Each first adaptive filter management module of the plurality of first adaptive filter management modules may correspond to a subband of the first subband domain AEC. Each first adaptive filter management module may be configured to control a first plurality of adaptive filters. The first plurality of adaptive filters may include at least a first adaptive filter type and a second adaptive filter type.

Some such methods involve extracting, e.g. by the control system, a first plurality of extracted features from the first adaptive filter management data. The first plurality of extracted features may correspond to a plurality of subbands of the first subband domain AEC. Some such methods involve estimating, e.g. by the control system, a current local acoustic state in the vicinity of the first audio device based, at least in part, on the first plurality of extracted features.

In some examples, the method may involve controlling one or more types of audio processing based, at least in part, on the current local acoustic state. Controlling one or more types of audio processing may, for example, involve controlling audio processing for audio data to be reproduced in the audio environment. In some instances, controlling one or more types of audio processing may involve controlling automatic speech recognition processing. Controlling one or more types of audio processing may, for example, involve controlling noise compensation processing. For example, controlling one or more types of audio processing may involve controlling the first subband domain AEC.

According to some examples, the current local acoustic state may be, or may include, a doubletalk state in which both speech and reproduced audio data are present in the vicinity of the first audio device. Alternatively, or additionally, the current local acoustic state be, or may include, an echo path change in the vicinity of the first audio device. In some instances, the current local acoustic state may include one or more of the following: a change of a location of the first audio device; a change one or more settings of the first audio device; a change of a configuration of an audio system that includes the first audio device; a level of playback audio; and/or a level of background noise.

In some instances, the method may involve receiving, from second through $N^{th}$ subband domain AECs of second through $N^{th}$ audio devices in the audio environment, second through $N^{th}$ adaptive filter management data from each of second through $N^{th}$ pluralities of adaptive filter management modules, N being an integer greater than 2. In some such examples, each of the second through $N^{th}$ pluralities of adaptive filter management modules may correspond to one of the second through $N^{th}$ audio devices. In some such examples, the method may involve extracting second through $N^{th}$ pluralities of extracted features from the second through $N^{th}$ adaptive filter management data. In some such examples, the method may involve estimating a current global acoustic state in the audio environment based, at least in part, on the first plurality of extracted features and the second through $N^{th}$ pluralities of extracted features.

Some such methods may involve controlling one or more types of audio processing based, at least in part, on the current global acoustic state. According to some such examples, controlling one or more types of audio processing for audio data based, at least in part, on the current global acoustic state may involve controlling one or more types of audio processing for audio data to be reproduced in the audio environment. In some such examples, the current global acoustic state may include a party state in which a plurality of people are in the audio environment. According to some such examples, controlling how audio data is rendered involves causing the audio data to be rendered according to a distributed rendering mode.

According to some examples, the first plurality of extracted features may include a rate at which first filter coefficients of the first adaptive filter type are copied into adaptive filters of the second adaptive filter type and/or a rate at which second filter coefficients of the second adaptive filter type are copied into adaptive filters of the first adaptive filter type.

In some examples, the first plurality of extracted features may include one or more of the following: a probability of the first adaptive filter type producing a lowest residual power during a time interval; a probability of the second adaptive filter type producing the lowest residual power during the time interval; a probability of an input microphone power being lower than a first residual produced via the first adaptive filter type or a second residual produced via the second adaptive filter type during the time interval; a probability of the first adaptive filter type producing a lowest residual power in a plurality of subbands; a probability of the second adaptive filter type producing the lowest residual power in the plurality of subbands; a probability of an input microphone power being lower than a first residual produced via the first adaptive filter type or a second residual produced via the second adaptive filter type in the plurality of subbands.

According to some examples, the first adaptive filter type may be relatively more aggressive than the second adaptive filter type. In some examples, the first adaptive filter type may be a linear adaptive filter type and the second adaptive filter type may be a non-linear adaptive filter type. In some instances, the first adaptive filter type may be a main adaptive filter and the second adaptive filter type may be a shadow adaptive filter. According to some examples, the first adaptive filter and second adaptive filter may be updated by different adaptive filtering algorithms. In some examples, the first adaptive filter may be comprised of a greater number of adapted filter coefficient values than the second adaptive filter.

In some implementations, the first adaptive filter management data does not include individual filter coefficient values. In some instances, the first adaptive filter management data does not include residual output of the first subband domain AEC.

In some examples, the first plurality of adaptive filters may include at least first through $M^{th}$ adaptive filter types, M being an integer of 3 or more. According to some such examples, the first plurality of extracted features may include one or more of the following: a probability of an $M^{th}$ adaptive filter type producing a lowest residual power; a probability of any one of the second through $(M-1)^{th}$ adaptive filter types producing the lowest residual power; a probability of an input microphone power being lower than a residual produced via any one of the first through $M^{th}$ adaptive filter types; and a rate at which filter coefficients of any one of the first through $M^{th}$ adaptive filter types are copied into adaptive filters of any other one of the first through $M^{th}$ adaptive filter types.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via apparatus. For example, one or more devices (e.g., a system that includes one or more devices) may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system may be configured for implementing some or all of the methods disclosed herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

FIGS. 7A, 7B, 7C, 7D and 7E are graphs that shows example plots of five extracted feature vectors obtained from the same MC-AEC during five different types of local acoustic state.

DETAILED DESCRIPTION OF EMBODIMENTS

Acoustic echo cancellers (AECs) are often implemented in the subband domain for both performance and cost reasons. A subband domain AEC (which also may referred to herein as a multi-channel AEC or MC-AEC) normally includes a subband AEC for each of a plurality of subbands. Furthermore, also for practical reasons, each subband AEC normally runs multiple adaptive filters, each of which is optimal in different acoustic conditions. The multiple adaptive filters are controlled by adaptive filter management modules that operate according to heuristics, so that overall the subband AEC may have the best characteristics of each filter.

The actions and hidden states of the adaptive filter management modules, along with the actual outputs of the individual adaptive filters themselves, thus contain implicit information about the acoustic conditions of an audio environment in which the MC-AEC is operating. Some disclosed implementations exploit this implicit information in order to provide functionality that was not previously available. For example, in some disclosed implementations, an ensemble of individual metrics, observations and/or features extracted from each of a plurality of subband AECs may be provided as input to an acoustic state estimator.

Figure 1A:
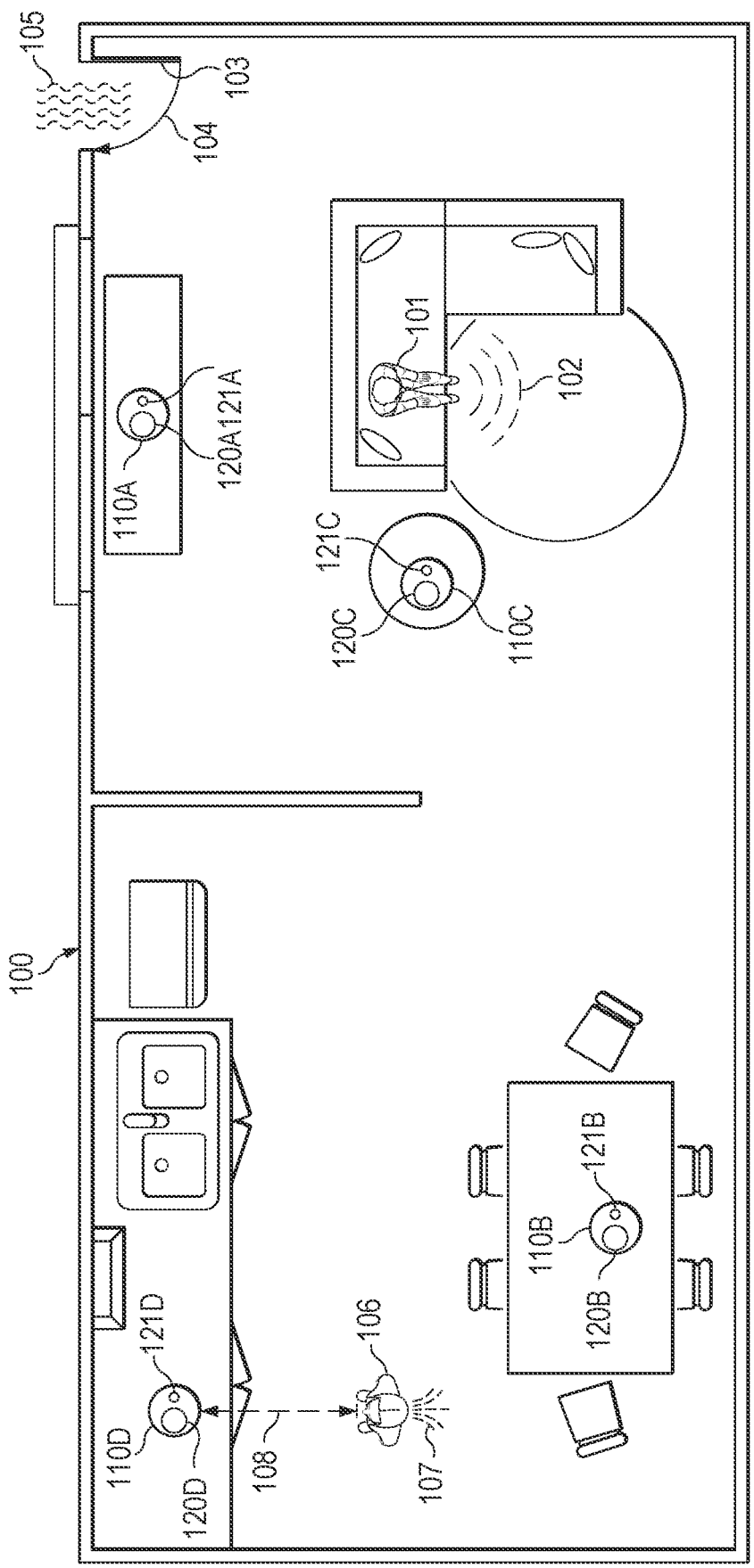
FIG. 1A shows an example of an audio environment.

FIG. 1A shows an example of an audio environment. As with other figures provided herein, the types and numbers of elements shown in FIG. 1A are merely provided by way of example. Other implementations may include more, fewer and/or different types and numbers of elements.

According to this example, the audio environment 100 includes audio devices 110A, 110B, 110C and 110D. In this example, each the audio devices 110A-110D includes a respective one of the microphones 120A, 120B, 120C and 120D, as well as a respective one of the loudspeakers 121A, 121B, 121C and 121D. According to some examples, each the audio devices 110A-110D may be a smart audio device, such as a smart speaker.

According to this example, multiple acoustic events are occurring in the audio environment 100. In this example, one acoustic event is caused by the talking person 101, who is talking in the vicinity of the audio device 110C. Element 102 is intended to represent speech of the talking person 101.

In this example, another acoustic event is caused, at least in part, by the variable element 103. Here, the variable element 103 is a door of the audio environment 100. According to this example, as the door 103 opens, sounds 105 from outside the environment may be perceived more clearly inside the audio environment 100. Moreover, the changing angle of the door 103 changes some of the echo paths within the audio environment 100. According to this example, element 104 represents a variable element of the impulse response of the audio environment 100 caused by varying positions of the door 103.

According to this example, another acoustic event is caused by the movement 107 of the walking person 106 towards the audio device 110D. In this example, element 108 represents a variable element of the impulse response of the audio environment 100 caused by the movement 107 of the walking person 106 towards the audio device 110D.

Some disclosed implementations are configured to estimate a current local acoustic state in the vicinity of an audio device (and/or, in some implementations, a current global acoustic state of the audio environment) based, at least in part, on features extracted from adaptive filter management data of an MC-AEC that is being implemented by the audio device. Some disclosed implementations are configured to estimate a current global acoustic state of the audio environment 100 based, at least in part, on features extracted from adaptive filter management data of each of a plurality of MC-AECs running on a corresponding plurality of audio devices in the audio environment 100. Various examples are described in detail below.

Figure 1B:
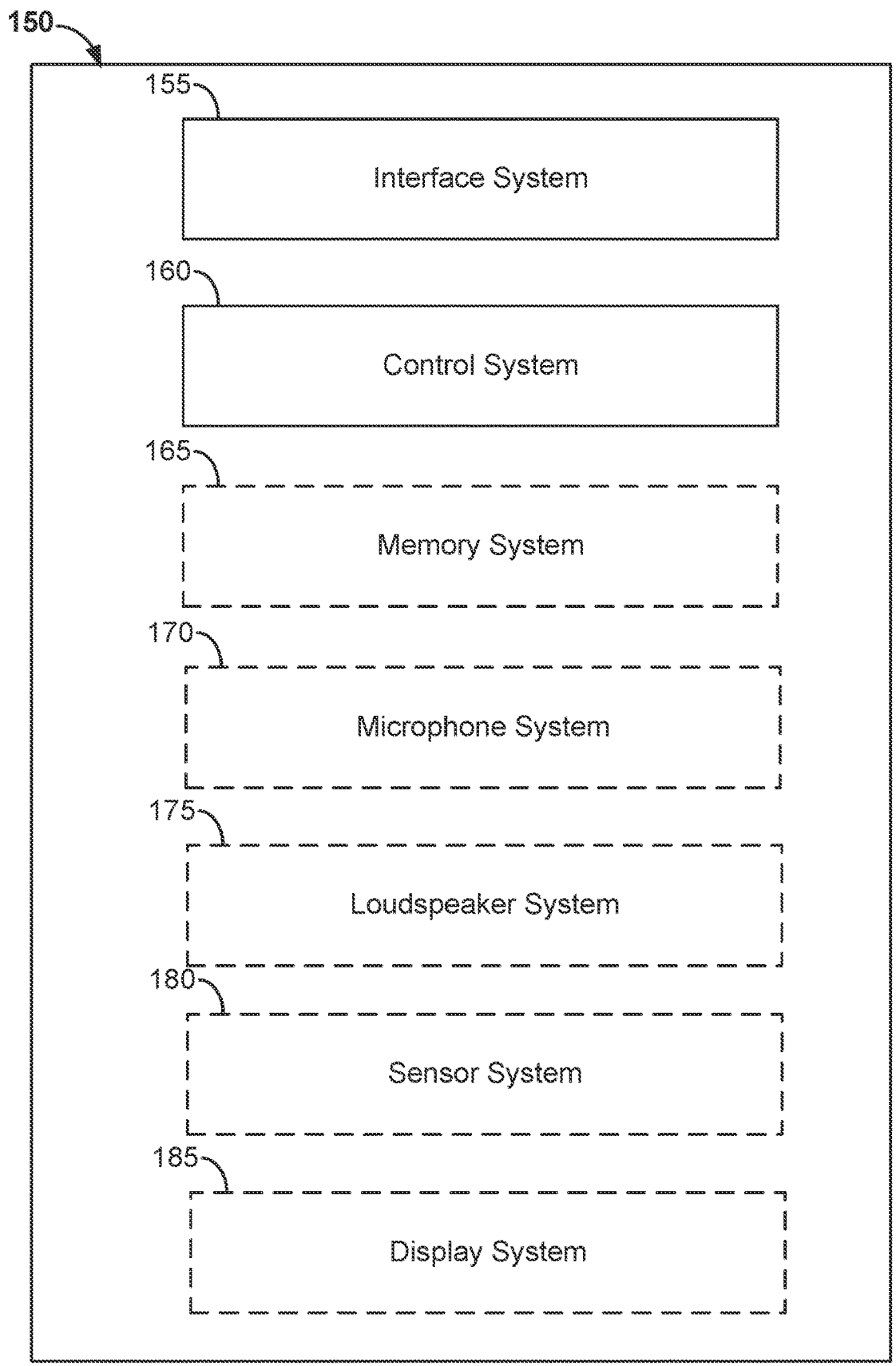
FIG. 1B is a block diagram that shows examples of components of an apparatus capable of implementing various aspects of this disclosure.

FIG. 1B is a block diagram that shows examples of components of an apparatus capable of implementing various aspects of this disclosure. As with other figures provided herein, the types and numbers of elements shown in FIG. 1B are merely provided by way of example. Other implementations may include more, fewer and/or different types and numbers of elements. According to some examples, the apparatus 150 may be configured for performing at least some of the methods disclosed herein. In some implementations, the apparatus 150 may be, or may include, one or more components of an audio system. For example, the apparatus 150 may be an audio device, such as a smart audio device, in some implementations. In other examples, the examples, the apparatus 150 may be a mobile device (such as a cellular telephone), a laptop computer, a tablet device, a television or another type of device.

According to some alternative implementations the apparatus 150 may be, or may include, a server. In some such examples, the apparatus 150 may be, or may include, an encoder. Accordingly, in some instances the apparatus 150 may be a device that is configured for use within an audio environment, such as a home audio environment, whereas in other instances the apparatus 150 may be a device that is configured for use in "the cloud," e.g., a server.

In this example, the apparatus 150 includes an interface system 155 and a control system 160. The interface system 155 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 155 may, in some implementations, be configured for exchanging control information and associated data with audio devices of the audio environment. The control information and associated data may, in some examples, pertain to one or more software applications that the apparatus 150 is executing.

The interface system 155 may, in some implementations, be configured for receiving, or for providing, a content stream. The content stream may include audio data. The audio data may include, but may not be limited to, audio signals. In some instances, the audio data may include spatial data, such as channel data and/or spatial metadata. Metadata may, for example, have been provided by what may be referred to herein as an "encoder." In some examples, the content stream may include video data and audio data corresponding to the video data.

The interface system 155 may include one or more network interfaces and/or one or more external device interfaces (such as one or more universal serial bus (USB) interfaces). According to some implementations, the interface system 155 may include one or more wireless interfaces. The interface system 155 may include one or more devices for implementing a user interface, such as one or more microphones, one or more speakers, a display system, a touch sensor system and/or a gesture sensor system. In some examples, the interface system 155 may include one or more interfaces between the control system 160 and a memory system, such as the optional memory system 165 shown in FIG. 1B. However, the control system 160 may include a memory system in some instances. The interface system 155 may, in some implementations, be configured for receiving input from one or more microphones in an environment.

The control system 160 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 160 may reside in more than one device. For example, in some implementations a portion of the control system 160 may reside in a device within one of the environments depicted herein and another portion of the control system 160 may reside in a device that is outside the environment, such as a server, a mobile device (e.g., a smartphone or a tablet computer), etc. In other examples, a portion of the control system 160 may reside in a device within one of the environments depicted herein and another portion of the control system 160 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 160 may reside in a device that is implementing a cloud-based service, such as a server, and another portion of the control system 160 may reside in another device that is implementing the cloud-based service, such as another server, a memory device, etc. The interface system 155 also may, in some examples, reside in more than one device.

In some implementations, the control system 160 may be configured for performing, at least in part, the methods disclosed herein. According to some examples, the control system 160 may be configured to estimate a current local acoustic state in the vicinity of an audio device based, at least in part, on features extracted from adaptive filter management data of an MC-AEC running on the audio device. In some implementations, the control system 160 may be configured to estimate a current global acoustic state of an audio environment based, at least in part, on features extracted from adaptive filter management data of each of a plurality of MC-AECs running on a corresponding plurality of audio devices in the audio environment.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 165 shown in FIG. 1B and/or in the control system 160. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 160 of FIG. 1B.

In some examples, the apparatus 150 may include the optional microphone system 170 shown in FIG. 1B. The optional microphone system 170 may include one or more microphones. According to some examples, the optional microphone system 170 may include an array of microphones. In some examples, the array of microphones may be configured to determine direction of arrival (DOA) and/or time of arrival (TOA) information, e.g., according to instructions from the control system 160. The array of microphones may, in some instances, be configured for receive-side beamforming, e.g., according to instructions from the control system 160. In some implementations, one or more of the microphones may be part of, or associated with, another device, such as a speaker of the speaker system, a smart audio device, etc. In some examples, the apparatus 150 may not include a microphone system 170. However, in some such implementations the apparatus 150 may nonetheless be configured to receive microphone data for one or more microphones in an audio environment via the interface system 160. In some such implementations, a cloud-based implementation of the apparatus 150 may be configured to receive microphone data, or data corresponding to the microphone data, from one or more microphones in an audio environment via the interface system 160.

According to some implementations, the apparatus 150 may include the optional loudspeaker system 175 shown in FIG. 1B. The optional loudspeaker system 175 may include one or more loudspeakers, which also may be referred to herein as "speakers" or, more generally, as "audio reproduction transducers." In some examples (e.g., cloud-based implementations), the apparatus 150 may not include a loudspeaker system 175.

In some implementations, the apparatus 150 may include the optional sensor system 180 shown in FIG. 1B. The optional sensor system 180 may include one or more touch sensors, gesture sensors, motion detectors, etc. According to some implementations, the optional sensor system 180 may include one or more cameras. In some implementations, the cameras may be free-standing cameras. In some examples, one or more cameras of the optional sensor system 180 may reside in a smart audio device, which may be a single purpose audio device or a virtual assistant. In some such examples, one or more cameras of the optional sensor system 180 may reside in a television, a mobile phone or a smart speaker. In some examples, the apparatus 150 may not include a sensor system 180. However, in some such implementations the apparatus 150 may nonetheless be configured to receive sensor data for one or more sensors in an audio environment via the interface system 160.

In some implementations, the apparatus 150 may include the optional display system 185 shown in FIG. 1B. The optional display system 185 may include one or more displays, such as one or more light-emitting diode (LED) displays. In some instances, the optional display system 185 may include one or more organic light-emitting diode (OLED) displays. In some examples, the optional display system 185 may include one or more displays of a smart audio device. In other examples, the optional display system 185 may include a television display, a laptop display, a mobile device display, or another type of display. In some examples wherein the apparatus 150 includes the display system 185, the sensor system 180 may include a touch sensor system and/or a gesture sensor system proximate one or more displays of the display system 185. According to some such implementations, the control system 160 may be configured for controlling the display system 185 to present one or more graphical user interfaces (GUIs).

According to some such examples the apparatus 150 may be, or may include, a smart audio device. In some such implementations the apparatus 150 may be, or may include, a wakeword detector. For example, the apparatus 150 may be, or may include, a virtual assistant.

Figure 2:
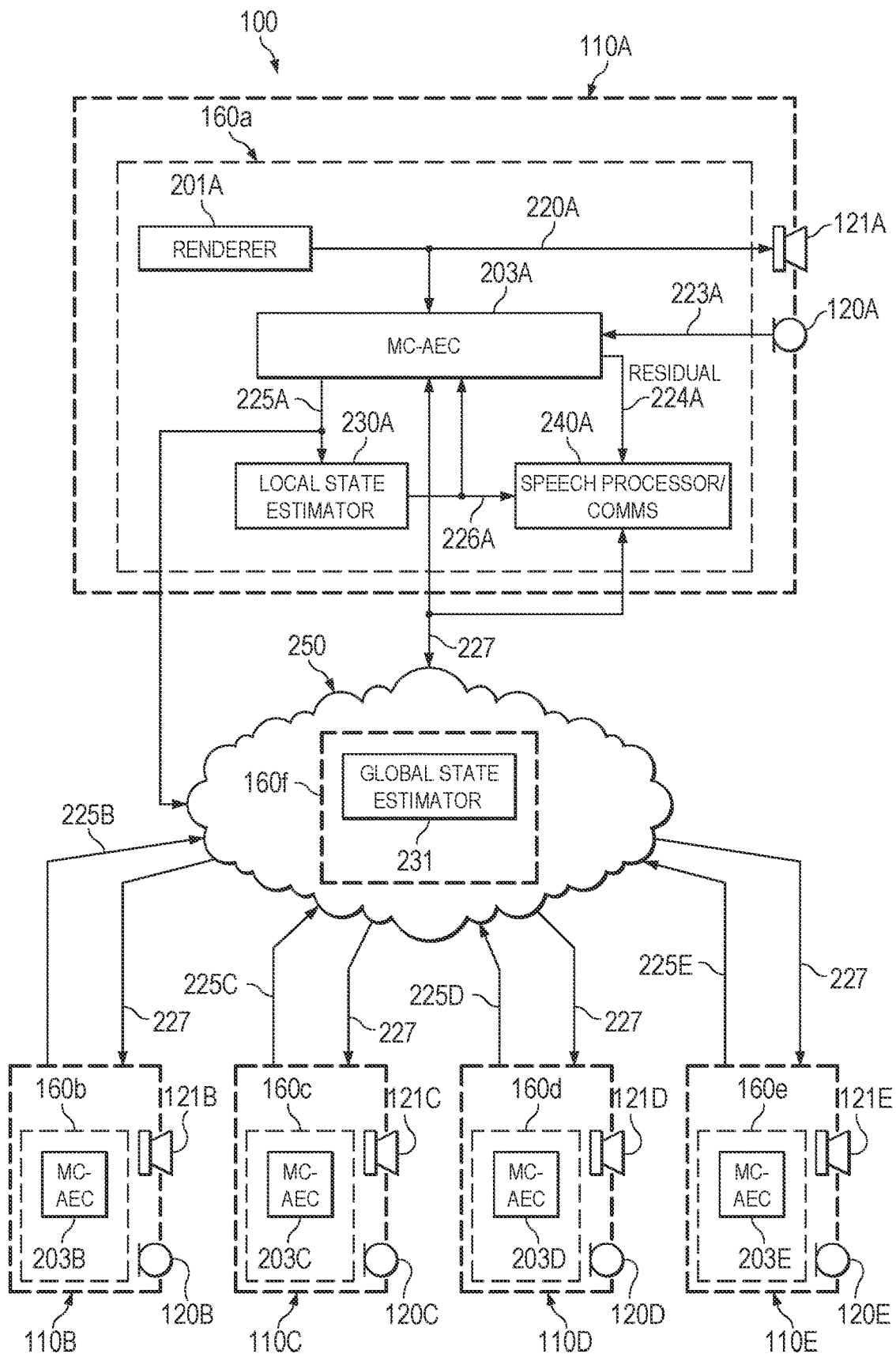
FIG. 2 is a system block diagram that represents components of audio devices according to one example.

FIG. 2 is a system block diagram that represents components of audio devices according to one example. In FIG. 2, the block representing the audio device 110A includes a loudspeaker 121A and a microphone 120A. In some examples, the loudspeaker 121A may be one of a plurality of loudspeakers in a loudspeaker system, such as the loudspeaker system 175 of FIG. 1B. Similarly, according to some implementations the microphone 120A may be one of a plurality of microphones in a microphone system, such as the microphone system 170 of FIG. 1B. In this example, the smart home hub 250 and each of the audio devices 110A-

110E includes an interface system, which may be an instance of the interface system 155 that is described above with reference to FIG. 1B.

In this example, the audio device 110A includes a renderer 201A, an MC-AEC 203A, a local state estimator 230A and a speech processor/communications block 240A. According to this example, the renderer 201A is configured to render audio data received by the audio device 110A or stored on the audio device 110A for reproduction on loudspeaker 121A. In this example, the renderer output 220A is provided to the loudspeaker 121A for playback and the renderer output 220A is also provided to the MC-AEC 203A as a reference for echo cancellation.

According to this example, the MC-AEC 203A includes a subband AEC for each of a plurality of subbands. Some detailed examples are disclosed below with reference to FIGS. 3 and 4. In addition to receiving the renderer output 220A, the MC-AEC 203A also receives microphone signals 223A from the microphone 120A. In this example, the MC-AEC 203A processes the microphone signals 223A and provides the echo-canceled residual 224A (which also may be referred to herein as "residual output 224A") to the speech processor/communications block 240A.

According to this example, the MC-AEC 203A provides adaptive filter management data 225A to the local state estimator 230A. In this example, the adaptive filter management data 225A does not include the residual output 224A. According to this implementation, the adaptive filter management data 225A does not include filter coefficient values corresponding to filter coefficients of the MC-AEC 203A. However, in some alternative implementations, the adaptive filter management data 225A may include the residual output 224A and/or filter coefficient values.

In some implementations, the speech processor/communications block 240A may be configured for speech recognition functionality. In some examples, the speech processor/communications block 240A may be configured to provide telecommunications services, such as telephone calls, video conferencing, etc. Although not shown in FIG. 2, the speech processor/communications block 240A may be configured for communication with one or more networks, the loudspeaker 121A and/or the microphone 120A, e.g., via an interface system. The one or more networks may, for example, include a local Wi-Fi network, one or more types of telephone networks, etc.

In this implementation, the local state estimator 230A is configured to estimate a current local acoustic state in the vicinity of the audio device 110A based, at least in part, on the adaptive filter management data 225A. In some examples, the local state estimator 230A may be configured to estimate the current local acoustic state based, at least in part, on a plurality of features extracted from the adaptive filter management data 225A.

In some examples, the current local acoustic state may be a doubletalk state in which both speech and reproduced audio data are present in the vicinity of the audio device 110A. According to some examples, the current local acoustic state may be an echo path change in the vicinity of the audio device 110A. In some instances, the current local acoustic state may involve a change of a location of the audio device 110A. In some examples, the current local acoustic state may involve a change in one or more settings of the first audio device, such as a change in audio driver settings, a change in playback level, a change in device audio latency, etc. In some examples, the current local acoustic state (and/or the current global acoustic state) may involve a change in audio environment configuration, such as opened or closed doors, opened or closed window shades, the movement of furniture, etc. Some such changes may cause corresponding changes in the reverberation "liveness" of the audio environment. According to some examples, the current local acoustic state (and/or the current global acoustic state) may involve a change in a configuration of an audio system that includes the first audio device, such as a change in device audio latency, a change of loudspeakers being used to reproduce sound (e.g., a High Definition Multimedia Interface (HDMI) output change from television loudspeakers to HiFi loudspeakers), a movement of the first audio device and/or one or more other audio devices of the audio environment, etc. In some instances, the current local acoustic state may involve a change in a level of background noise. Some detailed examples of estimating the current local acoustic state are described below.

In this example, estimated local acoustic state information 226A is output from the local acoustic state estimator 230A and is provided to the speech processor/communications block 240A and to the MC-AEC block 203A. Although not shown in FIG. 2, in some examples estimated local acoustic state information 226A may be provided to one or more other devices of the audio environment 100, such as to the smart home hub 250. The MC-AEC block 203A and/or the speech processor/communications block 240A may be controlled, at least in part, based on the estimated local acoustic state information 226A. For example, if the estimated local acoustic state information 226A indicates that the current local acoustic state includes a doubletalk state, in which both speech and reproduced audio data are present in the vicinity of the audio device 110A, the speech processor/communications block 240A (or another element of the control system 160a) may be configured to control the loudspeaker 121A and/or the microphone 120A in order to provide a more satisfactory telephone conference, e.g., by configuring an array of microphones of a microphone system for receive-side beamforming in the direction of a nearby talking person, by reducing playback volume of the loudspeaker 121A, etc. In some examples, the speech processor/communications block 240A may control the gating of audio to be sent during a conference call or other telephone call based, at least in part, on the estimated local acoustic state information 226A. According to some examples, the speech processor/communications block 240A may control a wakeword detector based, at least in part, on the estimated local acoustic state information 226A. For example, the estimated local acoustic state information 226A may comprise, or may be based at least in part on, a priori information (e.g. marking audio frames as voice or echo leakage) to improve performance of the wakeword detector.

According to some examples, an acoustic echo suppressor implemented by the MC-AEC block 203A may be controlled based, at least in part, on the estimated local acoustic state information 226A. In some examples, the control system 160a (e.g., the MC-AEC block 203A) may be configured to implement a noise suppressor based, at least in part, on the estimated local acoustic state information 226A. For example, noise estimation algorithms may adapt estimates more quickly if the estimated local acoustic state information 226A indicates an echo path change and/or a change in the noise floor of the audio environment.

According to this example, each the audio devices 110B-110E includes at least a control system, an MC-AEC, a microphone and a loudspeaker: the audio device 110B includes at least a control system 160b, an MC-AEC 203B, a microphone 120B and a loudspeaker 121B; the audio device 110C includes at least a control system 160c, an MC-AEC 203C, a microphone 120C and a loudspeaker 121C; the audio device 110D includes at least a control system 160d, an MC-AEC 203D, a microphone 120D and a loudspeaker 121D; and the audio device 110E includes at least a control system 160e, an MC-AEC 203E, a microphone 120E and a loudspeaker 121E. In this example, the MC-AEC 203B-MC-AEC 203E output adaptive filter management data 225B-225E, respectively. In some implementations, one or more of the audio devices 110B-110E may include a renderer, a speech processor/communications block and/or a local state estimator.

In some implementations, two or more (in some implementations, all) of the audio devices 110A-110E may be configured for communication with, and orchestrated by, a separate orchestrating device, such as what may be referred to herein as a smart home hub. In other examples, smart home hub functionality may be provided by one or more smart audio devices of the audio environment 100 (such as one or more of the audio devices 110A-110E), or may be shared by a separate orchestrating device and one or more other devices of the audio environment 100. Alternatively, or additionally, a portion of a control system (e.g., a control system configured to provide global state estimator, speech recognition and/or virtual assistant functionality), may reside in a device that is implementing a cloud-based service, such as a server, and another portion of the control system may reside one or more devices of the audio environment 100.

In this implementation, each of the audio devices 110A-110E provides information to, and receives information from, a smart home hub 250 that includes a control system 160f configured for implementing a global state estimator 231. According to this implementation, the global state estimator 231 is configured to estimate a current global acoustic state of the audio environment 100 based, at least in part, on adaptive filter management data 225A received from the audio device 110A, on adaptive filter management data 225B received from the audio device 110B, on adaptive filter management data 225C received from the audio device 110C, on adaptive filter management data 225D received from the audio device 110D and on adaptive filter management data 225E received from the audio device 110E. In some examples, the global state estimator 231 is configured to estimate the current global acoustic state of the audio environment 100, based, at least in part, on a plurality of features extracted from the adaptive filter management data 225A-225E. Alternatively, or additionally, in some implementations the global state estimator 231 may be configured to estimate the current global acoustic state of the audio environment 100, based, at least in part, on current local acoustic state information provided by one or more of the audio devices 110A-110E.

In this example, the global state estimator 231 is configured to provide a current global acoustic state estimation 227 to each of the audio devices 110A-110E. In some examples, the smart home hub 250 may be configured to provide control signals to one or more of the audio devices 110A-110E, such as control signals corresponding with the current global acoustic state estimation 227 and/or local acoustic state information received from one or more of the audio devices 110A-110E.

For example, if the adaptive filter management data and/or current local acoustic state information provided by two or more of the audio devices 110A-110E indicates that there is a doubletalk state in multiple locations of the audio environment 100, in which both speech and reproduced audio data are present in the vicinity of multiple audio devices, the global state estimator 231 may be configured to estimate that the current global acoustic state of the audio environment 100 corresponds to one or more ongoing conversations in the audio environment 100. In some such examples, the global state estimator 231 may be configured to determine that the one or more ongoing conversations in the audio environment 100 indicate that the current global acoustic state corresponds to a social gathering, such as a dinner, a party, etc. In some such examples, the current global acoustic state estimation 227 may indicate what may be referred to herein as a "social gathering mode." In some such examples, the smart home hub 250 may be configured to provide control signals to one or more of the audio devices 110A-110E corresponding to the social gathering mode, e.g., control signals for controlling audio reproduced by one or more of the audio devices 110A-110E to be reproduced in a spatially distributed manner. Some examples are described below with reference to FIG. 6. According to some such examples, the current global acoustic state estimation 227 may indicate what may be referred to herein as a "conversational mode." In some such examples, the smart home hub 250 may be configured to provide control signals to one or more of the audio devices 110A-110E corresponding to the conversational mode, e.g., control signals for controlling audio reproduced by one or more of the audio devices 110A-110E to be lower than a detected level of conversational sound.

According to some implementations, an individual audio device may make a current global acoustic state estimation. In some such examples, the individual audio device may implement the global state estimator 231 and may be configured to make a current global acoustic state estimation based on adaptive filter management data received from other local audio devices. Alternatively, or additionally, an individual audio device may be configured to make a current global acoustic state estimation based on directional microphone data obtained from directional microphones of the individual audio device. For example, the directional microphone data may indicate that there is a doubletalk state in multiple locations of the audio environment 100. According to some such examples, individual audio device may make a current global acoustic state estimation indicating a conversational mode or a social gathering mode.

In some implementations, one or more of the audio devices 110B-110E may not include a local state estimator. According to some such examples, the global state estimator 231 may be configured to determine local acoustic state information for one or more of the audio devices 110B-110E based on adaptive filter management data from a respective one or more of the audio devices 110B-110E. In some such examples, the global state estimator 231 may be configured to provide the local acoustic state information to one or more of the audio devices 110B-110E.

Figure 3:
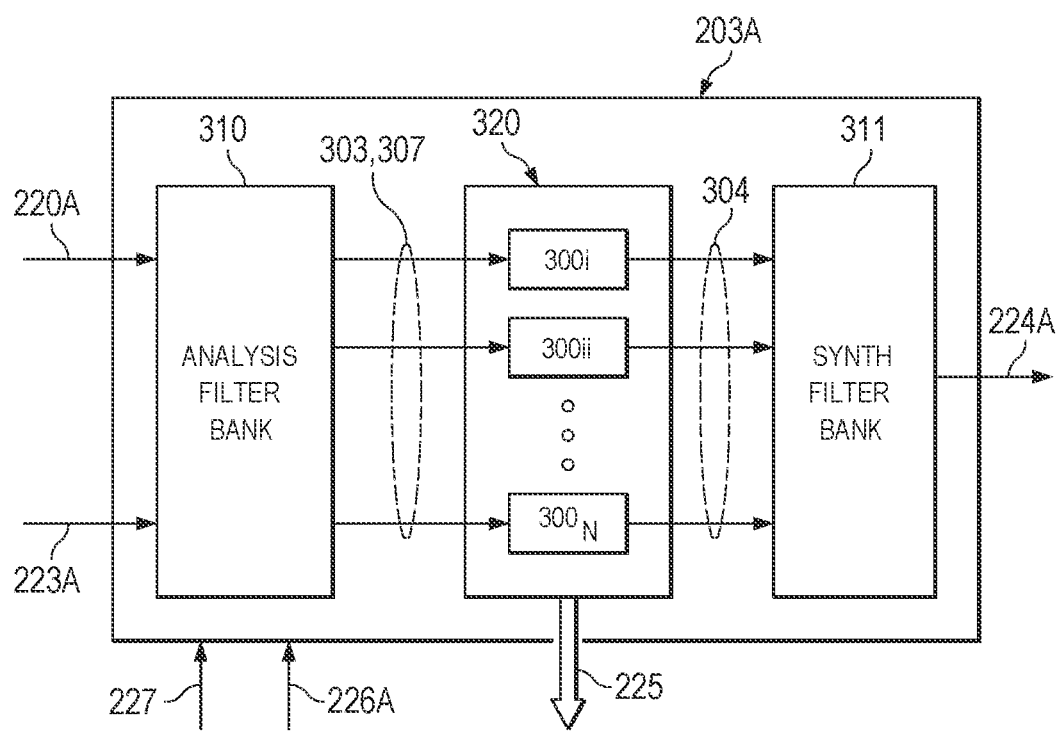
FIG. 3 shows example blocks of one multi-channel acoustic echo canceler (MC-AEC) shown in FIG. 2.

FIG. 3 shows example blocks of one multi-channel acoustic echo canceler (MC-AEC) shown in FIG. 2. FIG. 3 shows an example of a subband domain implementation of an AEC, which is also referred to herein as an MC-AEC. In this example, the MC-AEC 203A processes input microphone signals 223A and outputs the echo-canceled residual 224A (which also may be referred to herein as "residual output 224A").

In this implementation, the analysis filter block 310 is configured to decompose input full-band audio signals in the time domain into orthogonal components (the subband signals) in the frequency domain. In this example, the analysis filter block 310 receives the renderer output 220A and microphone signals 223A, and outputs corresponding subband domain echo references 303 and subband domain microphone signals 307 to block 320. Subsequent audio processing (echo cancellation) is performed in the frequency domain. Such implementations have the advantages of improved performance and decreased computational cost.

According to this example, block 320 includes N instances of subband AEC 300 (one instance for each subband). Example subband AECs 300*i*, 300*ii* and 300N are shown in FIG. 3, with the intervening dotted line representing the intervening subband AECs 300*iii*-300(N−1).

In this example, block 320 is configured to output echo-canceled subband domain residual signals 304 to the synthesis filter bank 311. Here, the synthesis filter bank 311 is configured to reconstruct the residual output 224A, which is a full-band signal in the time domain, from the subband domain residual signals 304.

According this example, block 320 is also configured to output an ensemble of feature vectors 225A that are extracted from the subband AECs 300*i*-300N. The feature vectors 225A may, for example, be provided to a local state estimator and/or a global state estimator, e.g., the local state estimator 230A and/or the global state estimator 231 shown in FIG. 2 and described above. Examples of the feature vectors 225A are described below.

In this example, the MC-AEC 203A also receives a current local acoustic state estimation 226A and a current global acoustic state estimation 227. In some implementations, the operations of the MC-AEC 203A (e.g., the functionality of block 320) may be controlled, at least in part, based on the current local acoustic state estimation 226A and/or the current global acoustic state estimation 227.

Figure 4:
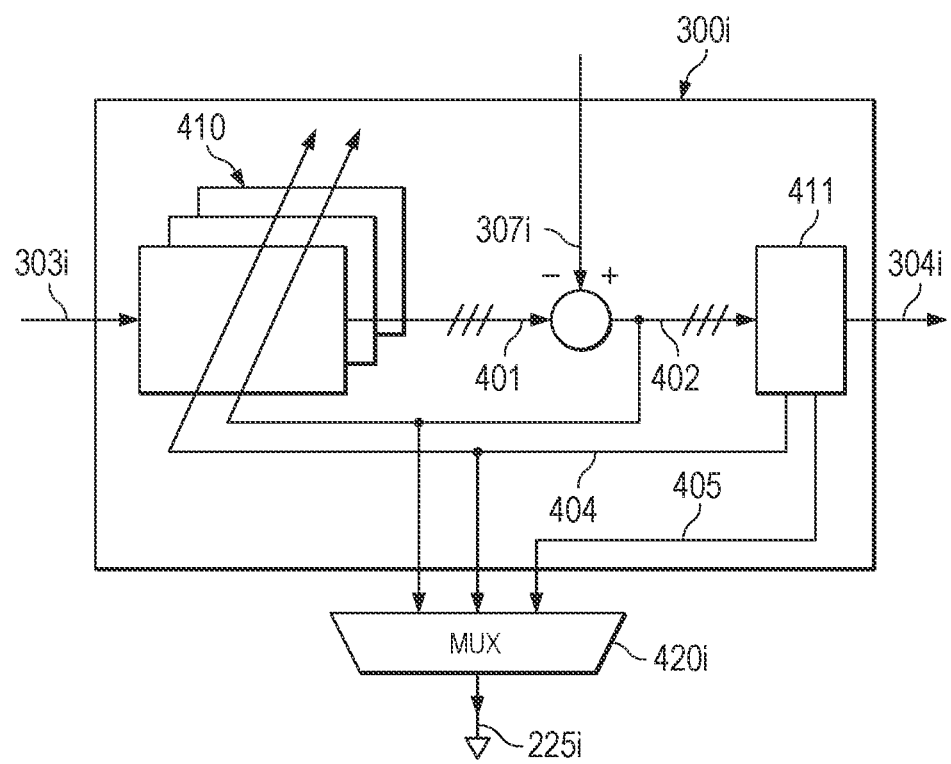
FIG. 4 shows examples of blocks of one of the subband AECs shown in FIG. 3.

FIG. 4 shows examples of blocks of one of the subband AECs shown in FIG. 3. In this example, the subband AEC 300*i* is configured to receive subband domain microphone signals 307*i* from the analysis filter bank 310 shown in FIG. 3 and to output one or more subband domain residual signals 304*i* to the synthesis filter bank 311 shown in FIG. 3. According to this example, the subband AEC 300*i* includes a plurality of subband domain adaptive filters 410 and an adaptive subband domain filter management module 411. Here, the plurality of subband domain adaptive filters 410 is shown receiving subband domain echo references 303*i*. The plurality of subband domain adaptive filters 410 includes N adaptive filters, where N varies according to the particular implementation. In some instances N=2, whereas in other implementations N≥3.

According to some examples, each adaptive filter of the plurality of subband domain adaptive filters 410 may perform better in different acoustic conditions. For example, one type of adaptive filter may be better at tracking echo path changes whereas another type of adaptive filter may be better at avoiding misadaptation during instances of double-talk. The plurality of subband domain adaptive filters 410 may, in some examples, include a continuum of adaptive filters. The plurality of subband domain adaptive filters 410 may, for example, range from a highly adaptive or aggressive adaptive filter (which may sometimes be referred to as a "main" adaptive filter) that determines filter coefficients responsive to current audio conditions (e.g., responsive to a current error signal) to a highly conservative adaptive filter (which may sometimes be referred to as a "shadow" adaptive filter) that provides little or no change in filter coefficients responsive to current audio conditions.

In some implementations, the plurality of subband domain adaptive filters 410 may include adaptive filters having a variety of adaptation rates, filter lengths and/or adaptation algorithms (e.g., adaptation algorithms that include one or more of least mean square (LMS), normalized least mean square (NLMS), proportionate normalized least mean square (PNLMS) and/or recursive least square (RLS)), etc. In some implementations, the plurality of subband domain adaptive filters 410 may include linear and/or non-linear adaptive filters, adaptive filters having different reference and microphone signal time alignments, etc. According to some implementations, the plurality of subband domain adaptive filters 410 may include an adaptive filter that only adapts when the output is very loud or very quiet. For example, a "party" adaptive filter might only adapt to the loud parts of output audio.

According to this example, the plurality of subband domain adaptive filters 410 outputs a plurality of predicted subband domain echo signals 401, one from each of the adaptive filters. Each of the predicted subband domain echo signals 401 may be regarded as a hypothesis for the echo path.

For each of the predicted subband domain echo signals 401, a subband domain residual signal 402 is produced, e.g. by subtracting the predicted subband domain echo signal 401 of the respective subband from the subband domain microphone signal 307*i* of the respective subband.

In this example, the subband domain adaptive filter management module 411 is configured to select one or more subband domain residual signals 304*i* from the set of subband domain residual signals 402 produced by the plurality of subband domain adaptive filters 410 as output. In this example, each subband domain residual signal of the set of subband domain residual signals 402 is also provided to the corresponding adaptive filter and to the multiplexer 420*i*.

According to some examples, the subband domain adaptive filter management module 411 may be configured to select a subband domain residual signal from the set of subband domain residual signals 402 according to a set of heuristic rules. For example, the subband domain adaptive filter management module 411 may be configured to monitor the state of the system and to manage the plurality of subband domain adaptive filters 410 through mechanisms such as copying filter coefficients from one adaptive filter into the other if certain conditions are met (e.g., one is outperforming the other). For example, if adaptive filter A is clearly outperforming adaptive filter B, the subband domain adaptive filter management module 411 may be configured to copy the filter coefficients for adaptive filter A to adaptive filter B. In some instances, the subband domain adaptive filter management module 411 may also issue reset commands to one or more adaptive filters of the plurality of subband domain adaptive filters 410 if the subband domain adaptive filter management module 411 detects divergence.

According to this example, the subband domain adaptive filter management module 411 is also configured to provide one or more selected subband domain residual signals 404 and subband domain adaptive filter management data 405 to the multiplexer 420*i*. The subband domain adaptive filter management data 405 may, for example, correspond to instructions that the subband domain adaptive filter management module 411 is sending to the plurality of subband domain adaptive filters 410. Here, the multiplexer 420*i* is configured to multiplex the set of subband domain residual signals 402, the one or more selected subband domain residual signals 404 and adaptive filter management data 405 to produce the subband domain ensemble of feature vectors 225A*i*. In alternative implementations, the subband domain ensemble of feature vectors 225A*i* may be based only on the subband domain adaptive filter management data 405.

Figure 5:
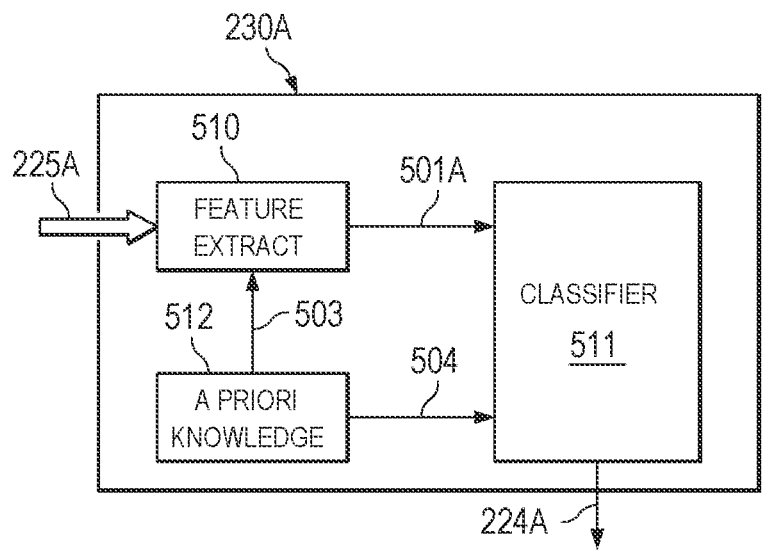
FIG. 5 shows example blocks of a local state estimator according to one example.

FIG. 5 shows example blocks of a local state estimator according to one example. According to this example, the local state estimator is an instance of the local state estimator 230A of audio device 110A of FIG. 2. In this example, the local state estimator 230A is configured to produce an estimate of the current acoustic state in the vicinity of the audio device 110A, based at least in part on the ensemble of feature vectors 225A received from the MC-AEC 203A of FIG. 2 or FIG. 3, and to output estimated local acoustic state information 226A.

According to this example, the local state estimator 230A includes a feature extraction block 510, an acoustic space knowledge block 512 and a classifier 511. According to this example, the functionality of the feature extraction block 510 may be based, at least in part, on acoustic space parameters 503 from the acoustic space knowledge block 512. For example, if the acoustic space knowledge block 512 has a priori knowledge of a persistent noise source in a particular frequency range, the acoustic space parameters 503 may include corresponding information. In response to this portion of the acoustic space parameters 503, the feature extraction block 510 may not extract features corresponding to that frequency range. Similarly, in this example, the functionality of the classifier 511 may be based, at least in part, on acoustic space information 504 from the acoustic space knowledge block 512. Some examples of how the functionality of the classifier 511 may be based, at least in part, on acoustic space information 504 are provided below.

In this example, the feature extraction block 510 is configured to extract features from the ensemble of feature vectors 225A and output the extracted features 501A. The extracted features 501A may vary according to the particular implementation. In some examples, the extracted features 501A may include adaptive filter reset information, instances of adaptive filter coefficient copying, etc. In some instances in which the feature vectors 225A correspond to at least a first adaptive filter type and a second adaptive filter type, the extracted features 501A may include one or more of the following: a probability of the first adaptive filter type producing a lowest residual power; a probability of the second adaptive filter type producing the lowest residual power; a probability of an input microphone power being lower than a first residual produced via the first adaptive filter type or a second residual produced via the second adaptive filter type; a rate at which first filter coefficients of the first adaptive filter type are copied into adaptive filters of the second adaptive filter type; and/or a rate at which second filter coefficients of the second adaptive filter type are copied into adaptive filters of the first adaptive filter type. In some instances in which the feature vectors 225A correspond to at least first through $M^{th}$ adaptive filter types, M being an integer of 3 or more, the extracted features 501A may include one or more of the following: a probability of an $M^{th}$ adaptive filter type producing a lowest residual power; a probability of any one of the first through $(M-1)^{th}$ adaptive filter types producing the lowest residual power; a probability of an input microphone power being lower than a residual produced via any one of the first through $M^{th}$ adaptive filter types; and/or a rate at which filter coefficients of any one of the first through $M^{th}$ adaptive filter types are copied into adaptive filters of any other one of the first through $M^{th}$ adaptive filter types.

Let $P_{i,j}$ be the power of a subband domain residual signal corresponding to subband i produced by adaptive filter type j. In an example, a probability of the adaptive filter type k producing a lowest residual power is determined as the number of subbands for which $P_{i,j=k}$ is smaller than $P_{i,j\neq k}$ as fraction of the total number of subbands. For example, with 100 subbands, a probability of 0.45 for filter type 1 means that for 45 of the 100 subbands i the residual power for filter type 1, $P_{i,1}$, is lower than the residual power $P_{i,j\neq 1}$ for other filter types. In this example, the classifier 511 is configured to estimate a local acoustic state based, at least in part, on the extracted features 501A provided by the feature extraction block 510. The local acoustic state may, in some instances, be (or include) a doubletalk state in which both speech and reproduced audio data are present in the vicinity of the audio device 110A. In some instances, the local acoustic state may be (or include) an echo path change in the vicinity of the audio device 110A. In some examples, the local acoustic state may be (or include) a change of a location of the audio device 110A, a change one or more settings of the audio device 110A, a change of a configuration of an audio system that includes the audio device 110A, and/or a level of background noise in the vicinity of the audio device 110A. Various examples of estimating a local acoustic state based on extracted features are provided below.

According to some examples, the acoustic space knowledge block 512 includes a knowledge base regarding the audio environment 100. For example, the acoustic space knowledge block 512 may include a memory having stored information regarding estimated audibility in the audio environment 100, e.g., the estimated audibility of one or more (in some cases all) of the audio devices in the audio environment 100. According to some examples, the acoustic space knowledge block 512 may include a memory having stored information regarding the locations of walls, furniture and/or other objects in the audio environment 100 that may affect the reflection and/or absorption of sound. In some implementations, the control system 160a of audio device 110A may be configured to insert "gaps" into played-back audio signals. As used herein, a "gap" in an audio signal (and in playback content of the audio signal) denotes a time (or time interval) of the signal at (or in) which playback content (e.g., in at least one frequency band) is missing (or has a level less than a predetermined value). The audio signal may have a banded frequency-domain representation (in each of a sequence of times, or time intervals, of the signal) comprising frequency-domain playback content in each band of a set of different frequency bands (at each time or time interval), and may have a gap in at least one of the frequency bands (at a time or time interval of the audio signal). Introduction of forced gaps into a playback signal in accordance some disclosed embodiments may be optimized to significantly reduce (or eliminate) the perceptibility of artifacts resulting from the introduced gaps during playback, preferably so that the forced gaps have no or minimal perceptible impact for the user, but so that the output signal of a microphone in the playback environment is indicative of the forced gaps (e.g., so the gaps can be exploited to implement a pervasive listening method). By using forced gaps which have been introduced in accordance with some disclosed embodiments, a pervasive listening system may monitor non-playback sound (e.g., sound indicative of background activity and/or noise in the playback environment).

In some examples, acoustic space information 504 from the acoustic space knowledge block 512 regarding audio environment audibility and/or background noise information may inform the classifier 511 regarding how to interpret one or more types of input data. For example, if the classifier 511 is evaluating an instance of possible echo path change in an area that has historically been associated with a lot of background noise events, the classifier 511 may impose a bias, such as a higher threshold for determining an echo path change, based on historical background noise information provided by the acoustic space knowledge block 512.

According to some examples, the acoustic space knowledge block 512 may include stored position information regarding the audio environment 100, e.g., the position and/or orientation of one or more (in some cases all) of the audio devices in the audio environment 100. Alternatively, or additionally, in some implementations the acoustic space knowledge block 512 may have stored information regarding known usage patterns of the audio environment 100. For example, the acoustic space knowledge block 512 may include stored information regarding locations in the audio environment 100 where one or more users congregate (e.g., the location (and in some instances the orientation(s)) of a sofa on which users sit to watch television, the location of a dining table at which people often gather and talk, etc.), areas of the audio environment 100 through which people often walk, door and/or openable window areas, etc. In some implementations, the acoustic space knowledge block 512 may include stored position information regarding both the position and orientation of one or more (in some cases all) of the audio devices in the audio environment 100, as well as the relative position of one or more locations in the audio environment 100 where one or more people congregate, and in some instances the orientation of the one or more people when in these one or more locations.

In some examples, acoustic space information 504 that indicates such position, orientation and/or usage information may inform the classifier 511 regarding how to interpret one or more types of input data. For example, if the classifier 511 is evaluating an instance of possible doubletalk in an area that has historically been associated with a lot of doubletalk, the classifier 511 may impose a bias, such as a lower threshold for detecting an instance of doubletalk, based on historical usage information provided by the acoustic space knowledge block 512.

Figure 7A:
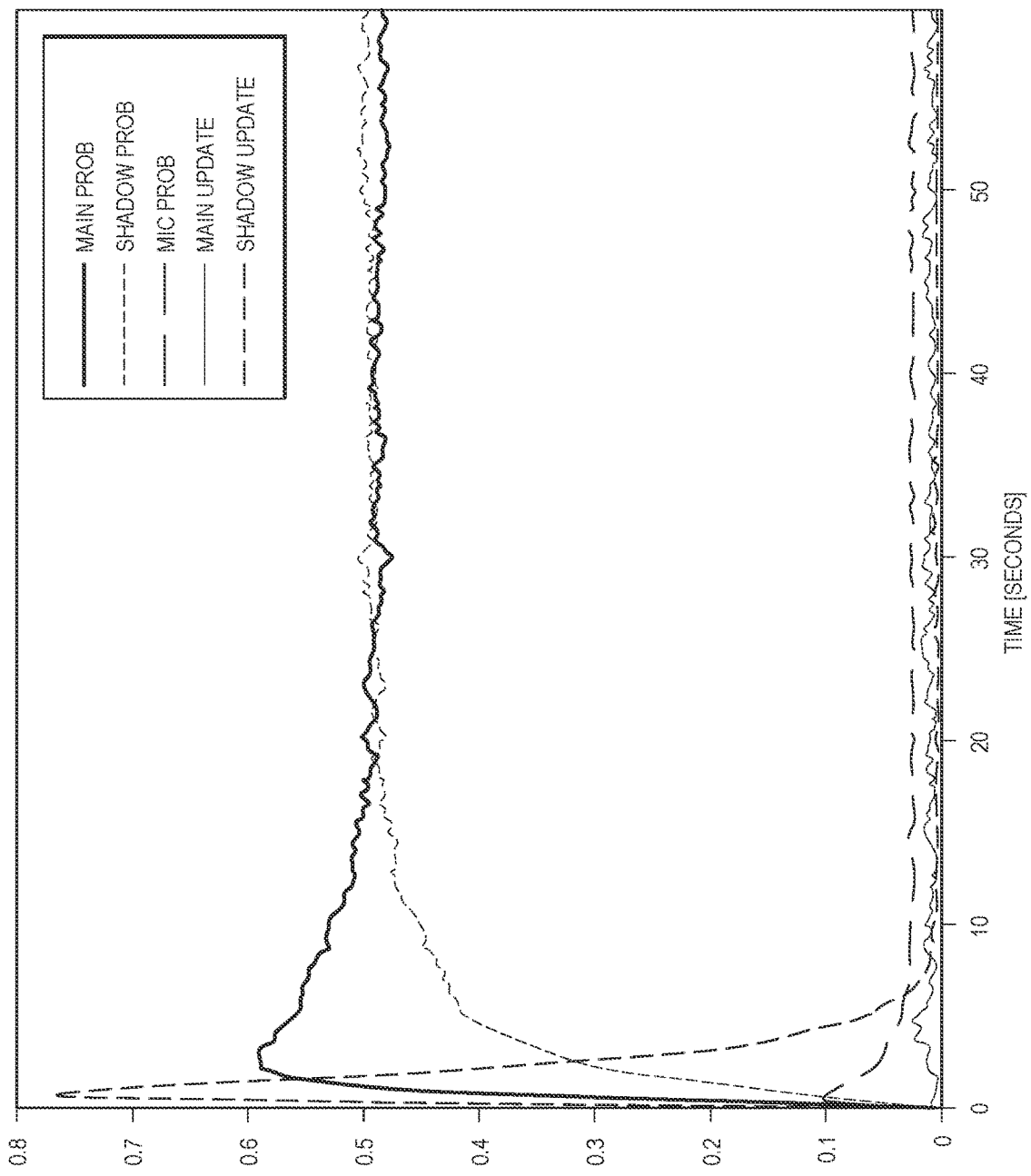

Alternatively, or additionally, in some implementations the acoustic space knowledge block 512 may have stored historical information regarding the feature vectors 225A received from the MC-AEC 203A, such as filter reset information, instances of filter coefficient copying, etc. For example, the acoustic space knowledge block 512 may include information regarding the nominal or unperturbed operating point of the MC-AEC 203A. One example of an unperturbed operating point of an MC-AEC is shown in FIG. 7A and described below.

In some implementations the acoustic space knowledge block 512 may include information regarding the audio device 110A itself, e.g., the loudspeaker types and capabilities (e.g., whether the audio device 110A includes a subwoofer and/or other loudspeakers, or only includes a small loudspeaker with limited bass reproduction capabilities), whether the loudspeaker(s) of audio device 110A is/are non-linear, "buzzy" device(s), etc. This type of information may inform the feature extraction block 510 and/or the classifier 511 regarding how to bias things.

For example, in some implementations audio frames may be flagged based on information from the acoustic space knowledge block 512 regarding the capabilities of audio device, e.g., to identify audio frames that are outside a range of safe operating levels of the audio device. In some examples, such audio frames may be discarded when making an estimate of an acoustic state. In other examples, such audio frames may be weighted less heavily than other audio frames when making an estimate of an acoustic state. Alternatively, or additionally, the acoustic space knowledge block 512 may include information regarding the capabilities of audio device to reproduce particular audio frequencies. Such information can aid the feature extraction block 510 in determining which frequency range to aggregate across. In some such examples, all values in the ensemble of feature vectors 225 corresponding to low frequencies that an audio device with no woofer cannot reproduce may be dropped or ignored. Alternatively, or additionally, the acoustic space knowledge block 512 may include information regarding the content that is being played in the acoustic space. In some examples, such information could enable the feature extraction to be optimized for different types of content (e.g., reproduced speech of a podcast may include different frequency and temporal ranges of interest than the reproduced sounds of an action movie).

Figure 6:
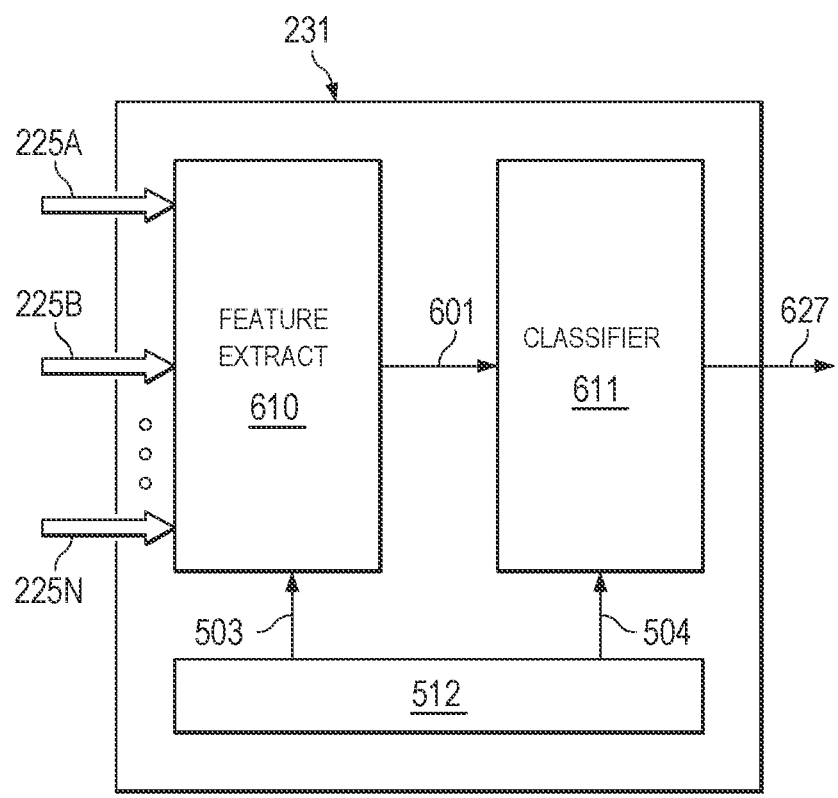
FIG. 6 shows example blocks of a global state estimator according to one example.

FIG. 6 shows example blocks of a global state estimator according to one example. According to this example, the global state estimator is an instance of the global state estimator 231 of audio device 110A of FIG. 2. In this example, the global state estimator 231 is configured to produce an estimate of the current acoustic state in the audio environment, based at least in part on the ensembles of feature vectors 225A-225N from corresponding audio devices 110A-110N, and to output estimated global acoustic state information 627.

According to this example, the global state estimator 231 includes a feature extraction block 610, an acoustic space knowledge block 512 and a classifier 611. According to this example, the functionality of the feature extraction block 610 may be based, at least in part, on acoustic space parameters 503 from the acoustic space knowledge block 512. Similarly, in this example, the functionality of the classifier 611 may be based, at least in part, on acoustic space information 504 from the acoustic space knowledge block 512. The feature extraction block 610 and the classifier 611 may, in some examples, use the acoustic space information 504 as described above with respect to the use of information from the acoustic space knowledge block 512 by the feature extraction block 510 and/or the classifier 511. However, one difference is that the feature extraction block 610 and the classifier 611 may have access to information regarding, e.g., the capabilities of a plurality of audio devices of the audio environment. Accordingly, the features extracted from the ensemble of feature vectors 225A-225N need not be a simple combination of the extracted features 501A-501N, such as a concatenation. The acoustic space knowledge block 512 may, for example, contain information regarding the diverse capabilities of the various audio devices in the audio environment. Using such information, the feature extraction block 610 may be able to derive a feature vector 601 that retains much of this information in a relatively more abstract and concise form.

In this example, the feature extraction block 510 is configured to extract features from the ensembles of feature vectors 225A-225N and output the extracted features 601. The extracted features 601 may vary according to the particular implementation. In some examples, the extracted features 601 may include one or more of the types of extracted features that are described above with reference to FIG. 5.

In this example, the classifier 611 is configured to estimate a global acoustic state based, at least in part, on the extracted features 601 provided by the feature extraction block 610. The global acoustic state may, in some instances, an indication that there is a doubletalk state in multiple locations of the audio environment 100, in which both speech and reproduced audio data are present in the vicinity of multiple audio devices, the global state estimator 231 may be configured to estimate that the current global acoustic state of the audio environment 100 corresponds to one or more ongoing conversations in the audio environment 100.

In some such examples, the global state estimator 231 may estimate that the one or more ongoing conversations in the audio environment 100 indicate that the current global acoustic state corresponds to a social gathering, such as a party, a family gathering, etc. In some such examples, the current global acoustic state estimation 227 may indicate what may be referred to herein as a "social gathering mode." In some such examples, the smart home hub 250 may be configured to provide control signals to one or more of the audio devices 110A-110N corresponding to the social gathering mode, e.g., control signals for controlling audio reproduced by one or more of the audio devices 110A-110N to be reproduced in a spatially distributed manner, which may be referred to herein as a spatially distributed rendering mode or a distributed rendering mode.

In some examples, part of a spatial mix may be rendered with more uniform distribution in a distributed rendering mode. In some such examples, the part of the spatial mix rendered with more uniform distribution in the distributed rendering mode is specified as the front sound stage. In the context of many spatial mixes, this makes sense since traditional mixing practices typically place the most important parts of the mix, such as dialog for movies and lead vocals, drums, and bass for music, in the front sound stage. This is true for most 5.1 and 7.1 surround sound mixes as well as stereo content up-mixed to 5.1 or 7.1 using algorithms such as Dolby Pro-Logic or Dolby Surround, where the front sound stage is given by the left, right and center channels. This is also true for many object-based audio mixes, such as Dolby Atmos, wherein audio data may be specified as front sound stage according to spatial metadata indicating an (x,y) spatial position of y<0.5.

However, with object-based audio, mixing engineers have the freedom to place audio anywhere in 3D space. With object-based music, in particular, mixing engineers are beginning to break from traditional mixing norms and place what would be considered important parts of the mix, such as lead vocals, in non-traditional locations, such as overhead. In such cases it becomes difficult to construct a simple rule for determining which components of the mix are appropriate for rendering in a more distributed spatial manner for the distributed rendering mode. Object-based audio already contains metadata associated with each of its constituent audio signals describing where in 3D space the signal should be rendered. To deal with the described problem, in some implementations additional metadata may be added allowing the content creator to flag particular signals as being appropriate for more distributed spatial rendering in the distributed rendering mode. During rendering, the system may use this metadata to select the components of the mix to which the more distributed rendering is applied. This gives the content creator control over the way that the distributed rendering mode sounds for a particular piece of content.

In some alternative implementations, a control system may be configured for implementing a content type classifier to identify one or more elements of the audio data to be rendered in a more spatially distributed manner. In some examples, the content type classifier may refer to content type metadata, (e.g., metadata that indicates that the audio data is dialogue, vocals, percussion, bass, etc.) in order to determine whether the audio data should be rendered in a more spatially distributed manner. According to some such implementations, the content type metadata to be rendered in a more spatially distributed manner may be selectable by a user, e.g., according to user input via a GUI displayed on a display device.

The method(s) used to render the one or more elements of the spatial audio mix in a more spatially distributed manner than in the reference spatial mode may vary between different embodiments. One example method involves creating multiple copies of each such element with multiple associated rendering locations distributed more uniformly across the listening space. In some implementations, the rendering locations and/or the number of rendering locations for a distributed spatial mode may be user-selectable, whereas in other implementations the rendering locations and/or the number of rendering locations for a distributed spatial mode may be pre-set. In some such implementations, a user may select a number of rendering locations for a distributed spatial mode and the rendering locations may be pre-set, e.g., evenly spaced throughout a listening environment. The system then renders all of these copies at their set of distributed positions as opposed to the original single element at its original intended position. According to some implementations, the copies may be modified in level so that the perceived level associated with the combined rendering of all the copies is the same as, or substantially the same as (e.g., within a threshold number of decibels, such as 2 dB, 3 dB, 4 dB, 5 dB, 6 dB, etc.) the level of the original single element in the reference rendering mode.

According to some examples, the current global acoustic state estimation 227 may indicate what may be referred to herein as a "conversational mode." According to some such examples, the current global acoustic state estimation 227 may differentiate a social gathering mode from a conversational mode by the playback level of one or more audio devices in the environment: a relatively lower playback level (and/or a playback level that is below a threshold level) may, in some such examples, indicate a conversational mode. In some such examples, the smart home hub 250 may be configured to provide control signals to one or more of the audio devices 110A-110N corresponding to the conversational mode, e.g., control signals for controlling audio reproduced by one or more of the audio devices 110A-110N to be lower than a detected level of conversational sound.

In this example, the acoustic space knowledge block 512 includes a knowledge base regarding the audio environment 100. According to some examples, the acoustic space knowledge block 512 may be as described above with reference to FIG. 5. For example, the acoustic space knowledge block 512 may include a memory having stored information regarding estimated audibility in the audio environment 100, e.g., the estimated audibility of one or more (in some cases all) of the audio devices in the audio environment 100. According to some examples, the acoustic space knowledge block 512 may include a memory having stored information regarding the locations of walls, furniture and/or other objects in the audio environment 100 that may affect the reflection and/or absorption of sound. In some implementations, the control system 160a of audio device 110A may be configured to insert "gaps" into played-back audio signals. By using forced gaps which have been introduced in accordance with some disclosed embodiments, a pervasive listening system may monitor non-playback sound (e.g., sound indicative of background activity and/or noise in the playback environment).

According to some examples, the acoustic space knowledge block 512 may include stored position information regarding the audio environment 100, e.g., the position and/or orientation of one or more (in some cases all) of the audio devices in the audio environment 100. Alternatively, or additionally, in some implementations the acoustic space knowledge block 512 may have stored information regarding known usage patterns of the audio environment 100. In some implementations, the acoustic space knowledge block 512 may include stored position information regarding both the position and orientation of one or more (in some cases all) of the audio devices in the audio environment 100, as well as the relative position of one or more locations in the audio environment 100 where one or more people congregate, and in some instances the orientation of the one or more people when in these one or more locations.

FIGS. 7A, 7B, 7C, 7D and 7E are graphs that shows example plots of five extracted features obtained from the same MC-AEC during five different types of local acoustic state. In these examples, the MC-AEC is running two complimentary types of adaptive filter. One is a highly adaptive or aggressive adaptive filter, which may be referred to as a "main" adaptive filter. The main adaptive filter determines filter coefficients responsive to current audio conditions (e.g., responsive to a current error signal). The other type of adaptive filter is a highly conservative adaptive filter, which may be referred to as a "shadow" adaptive filter. The shadow adaptive filter provides little or no change in filter coefficients responsive to current audio conditions. The combination of these complementary adaptive filters has been shown to achieve good cancellation performance and robustness.

In these examples, the MC-AEC utilizes 512 subbands. In other words, in the example of FIG. 3, wherein block 320 includes N instances of block 300, N=512. However, the features (sometimes referred to herein as AEC statistics) used for the graphs of FIGS. 7A-7E were extracted from only the first 100 subbands. In other implementations, features may be extracted from all subbands, from selected groups of subbands, etc. Alternatively, or additionally, different types of features may be extracted in other implementations.

However, in this example, the following five features were extracted from only the first 100 subbands: a main probability, a shadow probability, a microphone probability, a main update and a shadow update. The main prob(ability) is the probability of the main filter producing the lowest residual power over the first 100 subbands. For example, a main probability of 0.45 means that in 45 of the first 100 subbands the main filter produced the lowest residual power. The shadow prob(ability) is the probability of the shadow filter producing the lowest residual power over the first 100 subbands. The mic(rophone) prob(ability) is the probability of an input microphone power being lower the residual power produced by the main filter or the shadow filter over the first 100 subbands. One may think of the microphone probability as the probability that neither the main filter nor the shadow filter are successfully performing echo cancellation.

According to this example, the main update is the count of all filter coefficient copy events from the shadow filter into the main filter within the first 100 subbands. Similarly, the shadow update is the count of all filter coefficient copy events from the main filter into the shadow filter within the first 100 subbands. Here, the main and shadow update values are scaled so that they can fit on the same plot as the probability-related features.

FIG. 7A shows examples of the responses of these five features in an unperturbed MC-AEC. One may see that after −20 seconds the AEC has settled to its nominal (unperturbed) operating point. Before this, the AEC is still converging. When settled we can see that the main and shadow probability features are approximately equal. The plots of the main and shadow probability features in FIG. 7A and subsequent figures suggests that one could combine the main and shadow probability features into a single feature by calculating the difference between the main and shadow probability features. This is one example of how the feature extraction step may be different in other implementations.

In FIG. 7A, one may see that the main and shadow probability add to more than which is an indicator of good AEC performance, because most filters are producing net cancellation: After less than 10 seconds, the microphone probability is less than 0.05. One can also see that after settling down the main and shadow update values are relatively small, indicating that neither filter is significantly outperforming the other for a period of time. Looking at the first 10 seconds or so one can see that there is a large spike in the shadow update signal. This is because, in this particular embodiment, the main filter is able to converge faster than the shadow filter and as such the adaptive filter management modules detect that the main filter is performing significantly better than the shadow filter during this period of time and therefore copy the main filter coefficients into the shadow filter.

In FIGS. 7B-7E, the first 20 seconds have been omitted. This omission makes the graphs appear less busy by eliminating the times during which the AEC is settling down after a start-up time.

Figure 7B:
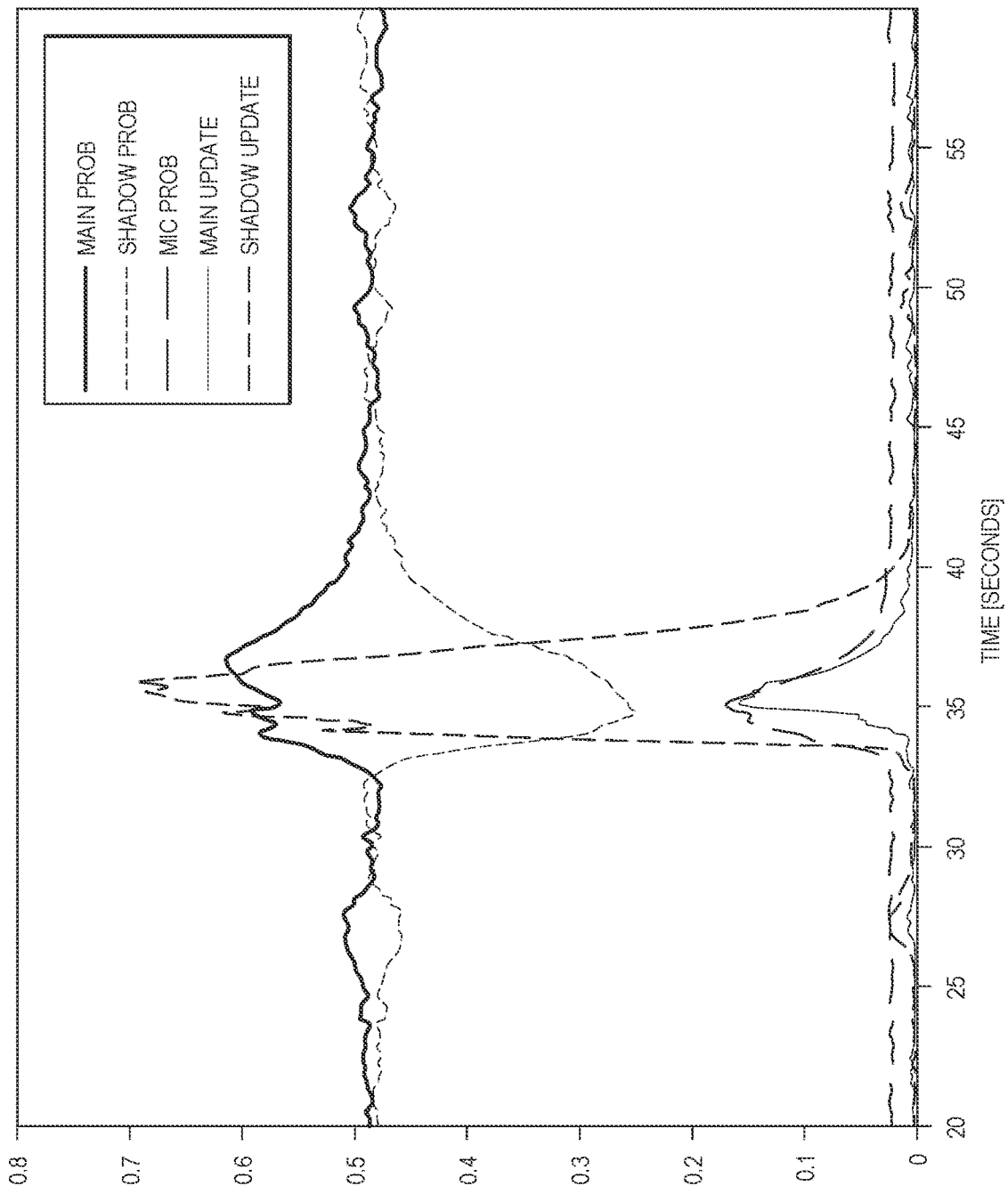

FIG. 7B shows examples of the responses of the same five features to an echo path change in the audio environment. In this instance, one of the present inventors was walking in front of the audio device in close proximity. At about 33 seconds, the inventor walked in front of the audio device and caused a large echo path change event. Because the main filter is able to converge to the new echo path much faster than the shadow filter, one may observe the following in FIG. 7B:

The main probability increases and the shadow probability decreases, because as the main filter can re-converge much faster;

There is a small peak in the microphone probability because the main and shadow filters do not re-converge until about 9 or 10 seconds after the echo path change, so in some subbands the adaptive filter management modules observe that the microphone signal has relatively less residual power.

There is a large peak in the shadow update signal because the main filter significantly outperforms the shadow filter for a period of time, causing filter coefficient copy events.

There is a small peak in the main update signal because the main filter, being more aggressive, is also more likely to mis-adapt during a large perturbation such as this one.

At this point, it may be helpful to recall that these five features are determined across an ensemble of subbands, so it is possible for the main filter to outperform the shadow in some subbands while the shadow filter outperforms the main filter at in other subbands. One important point is that on average (the ensemble average we take across the first 100 subbands to be specific) one can observe extracted feature signatures such as those shown in FIG. 7B during echo path change events.

FIG. 7C shows examples of the responses of the same five features to doubletalk in the audio environment. In this instance, at approximately 33 seconds one of the present inventors spoke the words "Listen Dolby, play a movie."

During the time that the inventor was speaking, the main filter mis-adapted due to the presence of the inventor's voice in the residual signal. However, the shadow filter dampens adaptation whenever there is a discrepancy between the predicted power and the power in the microphone and thus does not adapt when doubletalk occurs.

As a result, during the time interval of doubletalk (from approximately 33 to 35 seconds) the main probability increased because the main filter continued to adapt (and probably canceled some of the inventor's voice), thereby producing a lower residual power. Then, immediately after the time interval of doubletalk, the shadow filter outperformed the main filter (because the main filter has misconverged), causing a spike in the main update count (instances of shadow filter coefficients being copied into the main filter). As previously noted with reference to FIG. 7B, during a significant perturbation one may observe a spike in the microphone probability.

FIG. 7D shows examples of the responses of the same five features to a different type of acoustic event in the audio environment. In this instance, at approximately 35 seconds one of the present inventors picked up the audio device and at approximately 38 seconds (just before the second main update peak) placed the audio device back down. Moving the device caused an another type of echo path change in the audio environment. However, this echo path change differs significantly from the echo path change described with reference to FIG. 7B, in part because the inventor touched the device, causing noise in the microphone through coupling of the audio device body and its microphone. Also, placing the audio device back down caused vibrations through the audio device body into the microphone. Thus, picking up the audio device and placing it down produced changes in the extracted features that are somewhat like those produced by doubletalk, in the sense that there is additional non-echo signal in the microphone feed. One may observe two peaks in the main update signal, because the main filter has incorrectly adapted during the times of picking up and placing down of the audio device. After the audio device is placed back down, the echo path is different and the main filter converges to the new path much faster than the shadow filter does, causing the peaks in the shadow update signal shortly before and just after 40 seconds.

Figure 7E:
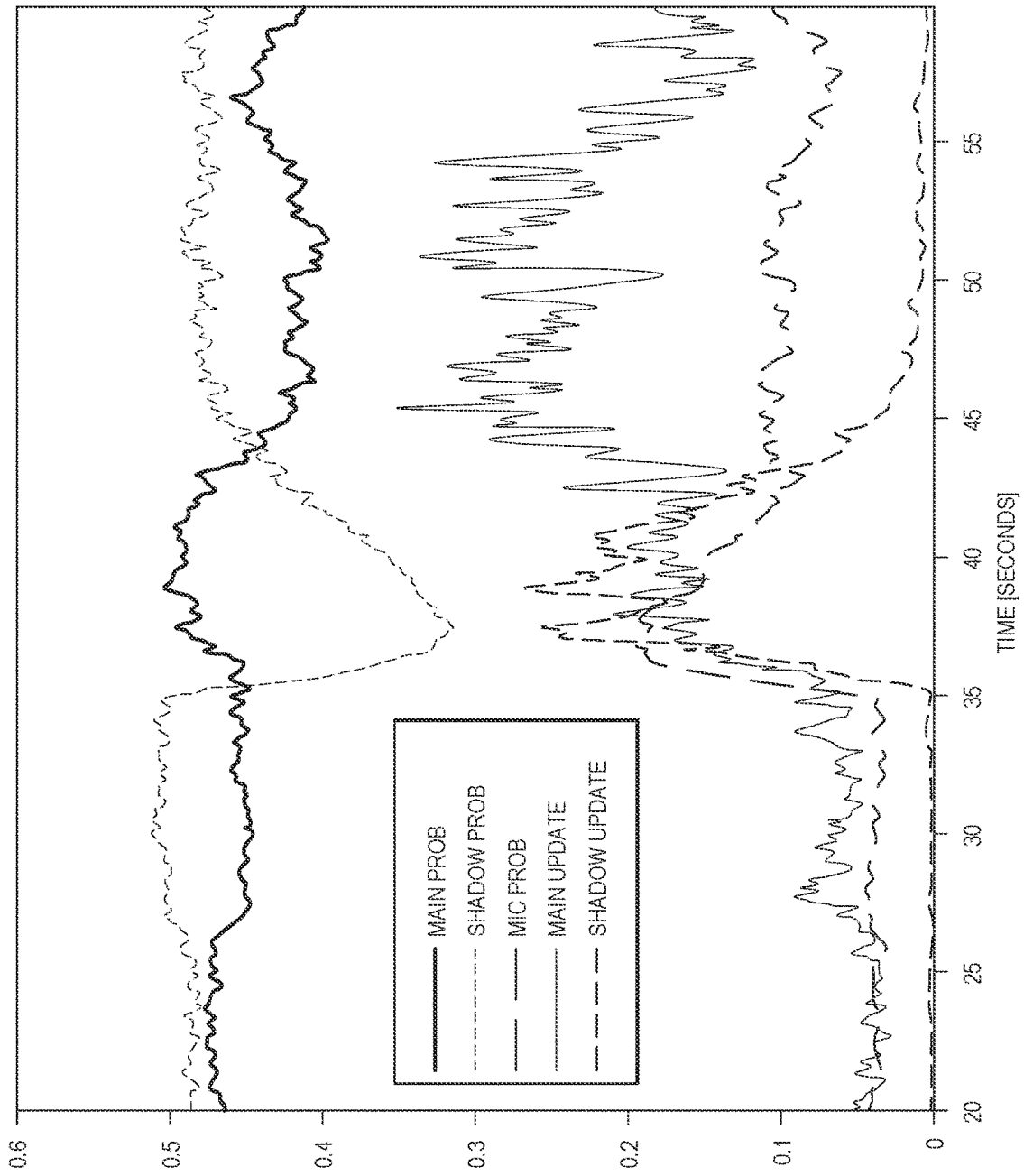

FIG. 7E shows examples of the responses of the same five features to another type of acoustic event in the audio environment. In this instance, at approximately 35 seconds one of the present inventors opened a door of the audio environment at a time during which a noise source (audio being reproduced by a radio) was present on the other side of the door. After that, the door remained open. Before the door was open, the radio was audible in the audio environment but the sounds produced by the radio were at relatively low levels in the audio environment. The time from approximately 35-45 seconds shows the above-described signature of an echo path change (a higher main probability, as compared to the shadow probability, and a peak in the shadow update signature).

However, one may observe in FIG. 7E that this re-convergence period is substantially longer than that shown in FIG. 7B, due to the noise source continuing to perturb the AEC and causing both the main and the shadow filters to perform worse (hence the slower re-convergence) than in the echo path change scenario described above with reference to FIG. 7B. One may also observe that after the re-convergence, there is a significant rise in both the main update and microphone probability, both of which indicate additional noise in the microphone feed. The additional noise causes the main filter to repeatedly mis-adapt, triggering main updates (copies of shadow filter coefficients to the main filter). Furthermore, the noise negatively impacts the performance of both filters and as such, on average, both filters perform worse, causing the observable rise in the microphone probability. Accordingly, the combination of an echo path change signature with a step up in the main update and mic probability levels can be used to detect a door opening with a noise source on the other side.

Figure 8A:
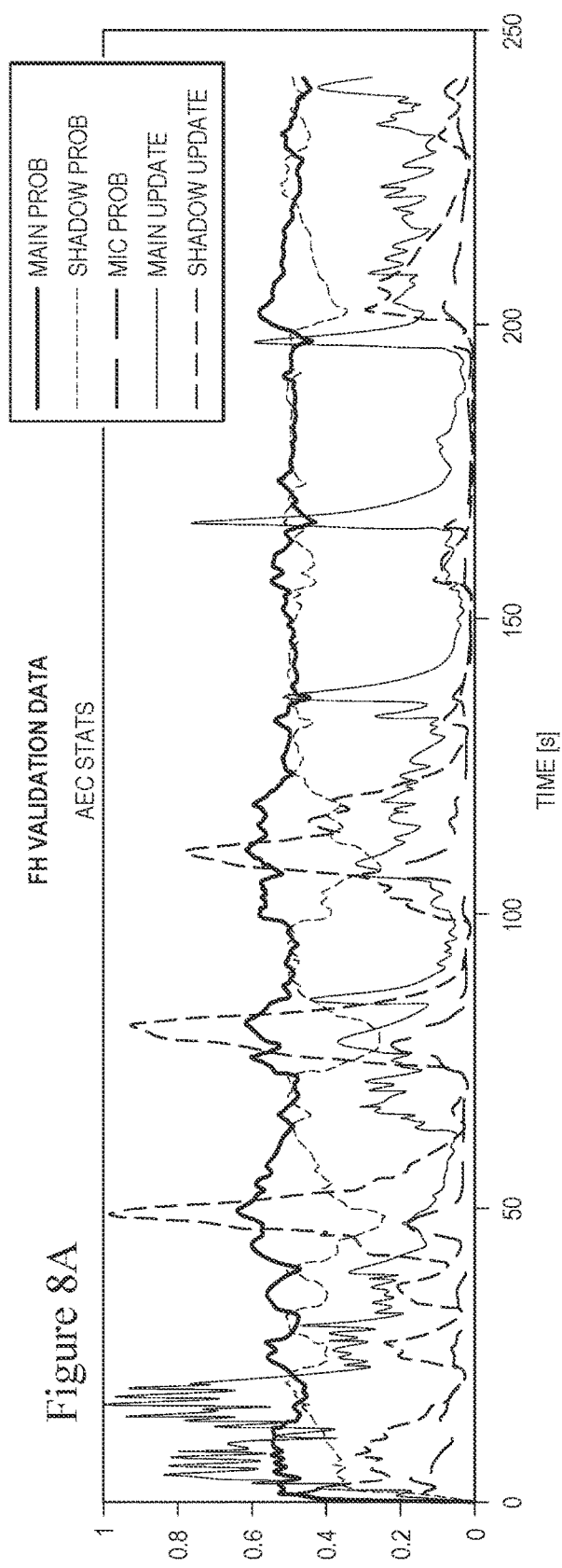
FIGS. 8A and 8B show graphs relating to validation of a linear classifier according to some examples.
Figure 8B:
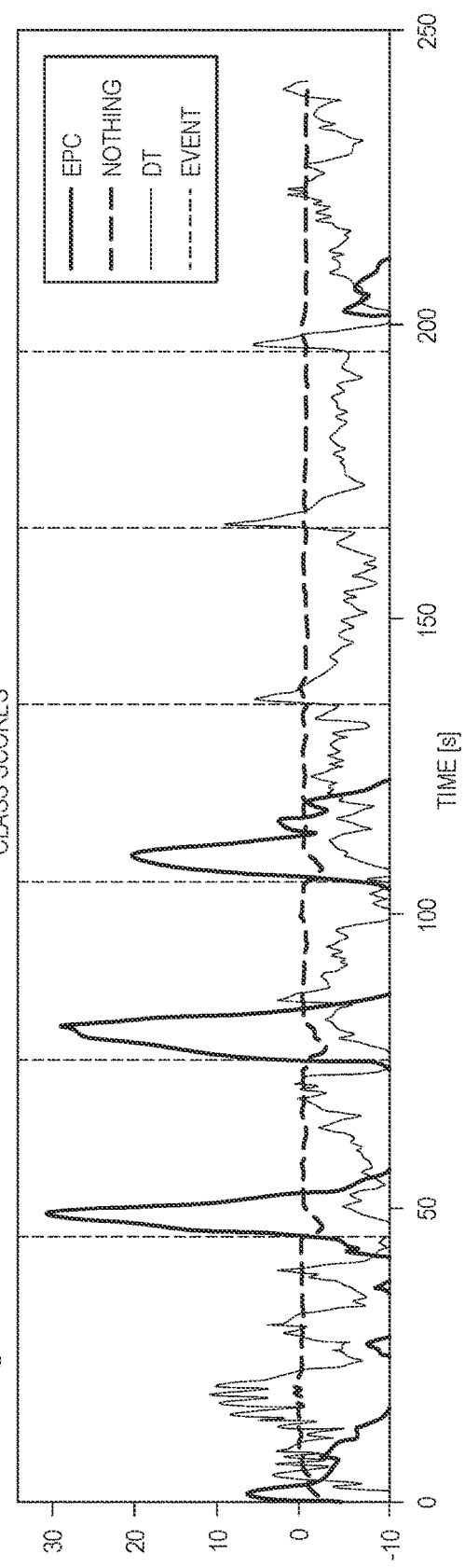

FIGS. 8A and 8B show graphs relating to validation of a linear classifier according to some examples. FIG. 8A shows plots of five extracted features obtained a MC-AEC during a validation test. The five extracted features are the same five extracted features that are described above with reference to FIGS. 7A-7E.

FIG. 8B shows plots of three types of output from the linear classifier during the validation test. According to this example, the three possible types of output from the linear classifier are an estimated echo path change (EPC), an estimated instance of doubletalk, or nothing/no predicted acoustic event. In these examples, the system is settling down for the first 45 seconds of so. The vertical dashed lines in FIG. 8B indicate acoustic event times. The first three acoustic events were echo path changes and the second three acoustic events were doubletalk events. In these examples, after the system settled down the linear classifier was able to successfully classify each acoustic event.

In this linear classifier example, a simple linear predictor groups the instantaneous 4×1 feature vector x, at time instant [n], as follows:

$$x[n]=[(\text{main\_prob}[n]-\text{shad\_prob}[n]),\text{mic\_prob}[n],\text{main\_update}[n],\text{shadow\_update}[n]]^T$$

According to this example, this feature vector contains only 4 elements because the main and shadow probabilities have been combined by taking the difference between the two, as discussed above. Using another set of data, the present inventors have determined (by way of a linear discriminant analysis, which is merely one way of "training" such a linear predictor) a set of weights w and a bias vector b that enables us to make a prediction using:

$$y=wx+b$$

In other words, the weights w and biases b are the parameters of the linear predictor. The values of w and b are determined during the training process. During runtime, the values of w and b may be used for inference (prediction) using the foregoing equation to obtain class scores y (arbitrarily scaled numbers) from the feature vector x. In the foregoing equation, y represents a 3×1 vector containing the scores of either an echo path change, doubletalk event or no event occurring in this example. Accordingly, y may be represented as follows:

$$y=[\text{echo\_path\_change\_score},\text{double\_talk\_score},\text{no\_event\_score}]^T$$

The foregoing expressions also imply that b is also a 3×1 vector and w is a 3×4 matrix. The resulting scores may, in some examples, be normalized (e.g., passed through a softmax operator) in order to produce another 3×1 vector, p, containing the probability of each event rather than arbitrarily-scaled scores where the $i^{th}$ element of the probability vector is $$p\_i = \frac{e^{y_i}}{\sum_{j=1}^{J} e^{y_j}}$$

and there are J classes (3 in this example). We take the class with the highest probability as the predicted event. In one example, the p vector may include the values [0.9, 0.05, 0.05] when an echo path change occurs.

In this linear classifier example, the present inventors ignored the initial convergence period of the MC-AEC. The data used to determine the optimal values of w and b contained only echo path changes and doubletalk events in this example, thus in this particular instance the present inventors did not produce a classifier that was configured to distinguish such other types of events.

Another limitation of the foregoing approach is that the present inventors only used the instantaneous feature vectors. In some more capable and useful implementations, the temporal signature of a feature vector may be considered. One way of taking the temporal signature of the feature vector into account is to modify the feature vector to stack the last M samples in addition to the current vector, e.g., as follows:

$X[n] = [\text{main\_prob}[n] - \text{shad\_prob}[n],$ $\text{mic\_prob}[n], \text{main\_update}[n], \text{shadow\_update}[n];$ $\text{main\_prob}[n-1] - \text{shad\_prob}[n-1], \text{mic\_prob}[n-1],$ $\text{main\_update}[n-1], \text{shadow\_update}[n-1];$ $\text{main\_prob}[n-2] - \text{shad\_prob}[n-2], \text{mic\_prob}[n-2],$ $\text{main\_update}[n-2], \text{shadow\_update}[n-2];$ $\ldots$ $\text{main\_prob}[n-M] - \text{shad\_prob}[n-M],$ $\text{mic\_prob}[n-M], \text{main\_update}[n-M],$ $\text{shadow\_update}[n-M];]^{\wedge}T$ According to the foregoing expression, x represents a 4×(M+1) matrix and w represents a (M+1)×3 matrix. By adding some temporal history, such a classifier would have a stronger discriminating ability, as may be seen by reference to any one of FIGS. 7A-7E and would be a more comprehensive classifier. Alternatively, or additionally, more features may be added to the feature vector. In some such examples, a feature of the ensemble of feature vectors 225 may correspond to adaptive filter reset counts from the subband domain adaptive filter management module 411. Such adaptive filter reset counts may correspond to instances in which the subband domain adaptive filter management module 411 resets adaptive filters because their output has diverged too far and cannot be recovered. In some such examples, one or more additional features of the ensemble of feature vectors 225 may correspond to other types of filter coefficient data, such as ensembles across subbands the power, magnitude, energy and/or phase of the filter taps. In some such examples, a feature of the ensemble of feature vectors 225 may correspond to one or more features of the residual output 224, such as the residual power and/or the echo return loss enhancement (ERLE).

Note that in order to generalize the above examples, one may replace 4 with "number_of_features" and 3 with "number_of_classes," with regard to the dimensionality of signals.

Figure 9:
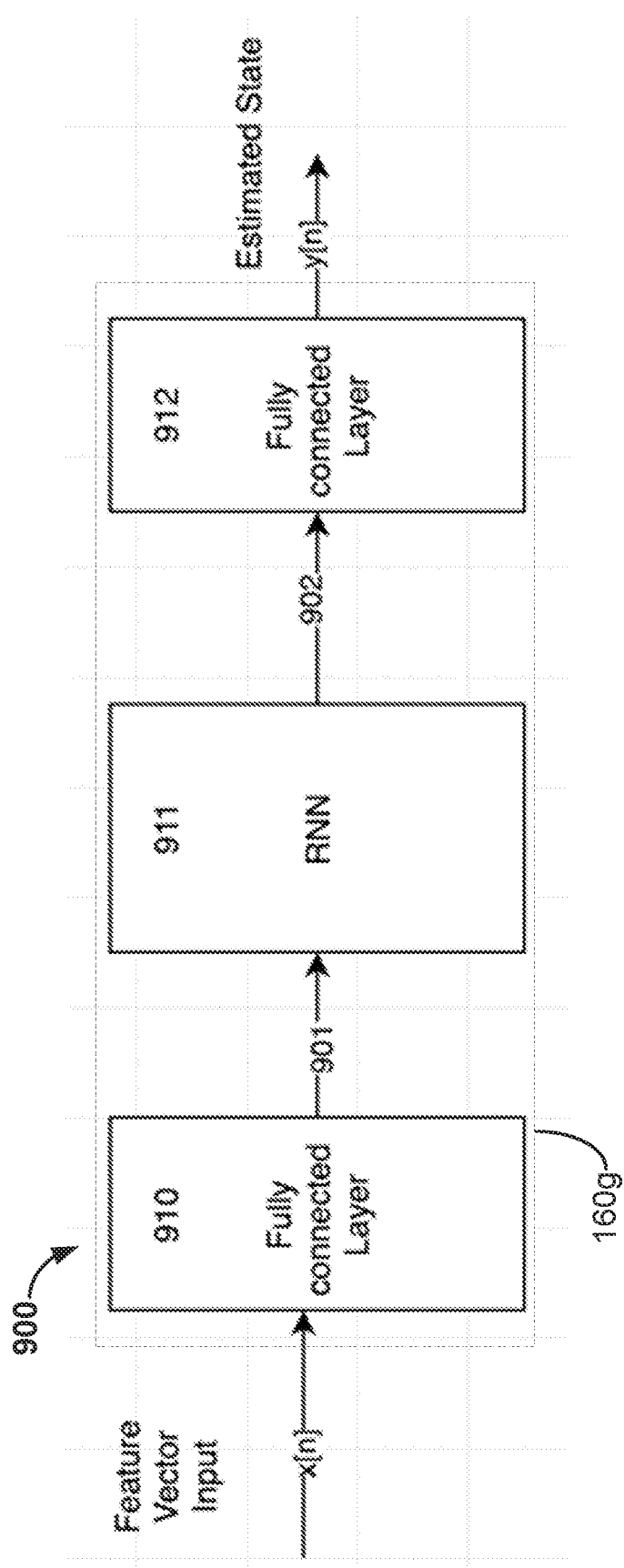
FIG. 9 shows a simple example of a deep neural network containing a recurrent neural network that is configured to exploit the temporal information in a feature vector x.

FIG. 9 shows a simple example of a deep neural network containing a recurrent neural network that is configured to exploit the temporal information in a feature vector x. The neural network 900 may, for example, be used to implement a local state estimator or a global state estimator. In this example, the neural network 900 is implemented via control system 160g, which is an instance of the control system 160 that is described above with reference to FIG. 1B.

According to this example, the input (feature vector x) and output (estimated state y) have not been numbered because they could be either the local or global state estimate (for example, the input/output could be 225/226 or 225/227). In this example, the first layer 910 of the neural network is a fully connected layer that includes a linear component similar to that of the full linear estimator example described above, followed by a non-linear activation function (e.g. a sigmoid). According to this example, the dimensionality of the first layer output 901 may differ according to the particular implementation and may be chosen by the neural network designer.

In this example, the recurrent neural network (RNN) 911 receives the first layer output 901 and produces RNN output 902, the dimensionality of which also may differ according to the particular implementation. According to this implementation, the final layer 912 is another fully connected layer that includes a linear component and has a non-linear activation function such as a softmax function. In this example, the final layer 912 produces the estimated state y(n).

The neural network 900 may be trained via input data such as that described above with reference to FIGS. 7A-8A, using "ground truth" indicating actual acoustic events, e.g., by training the neural network to minimize a cost function that is based on the difference between the probability of a predicted acoustic event and that of an actual "ground truth" acoustic event.

Figure 10:
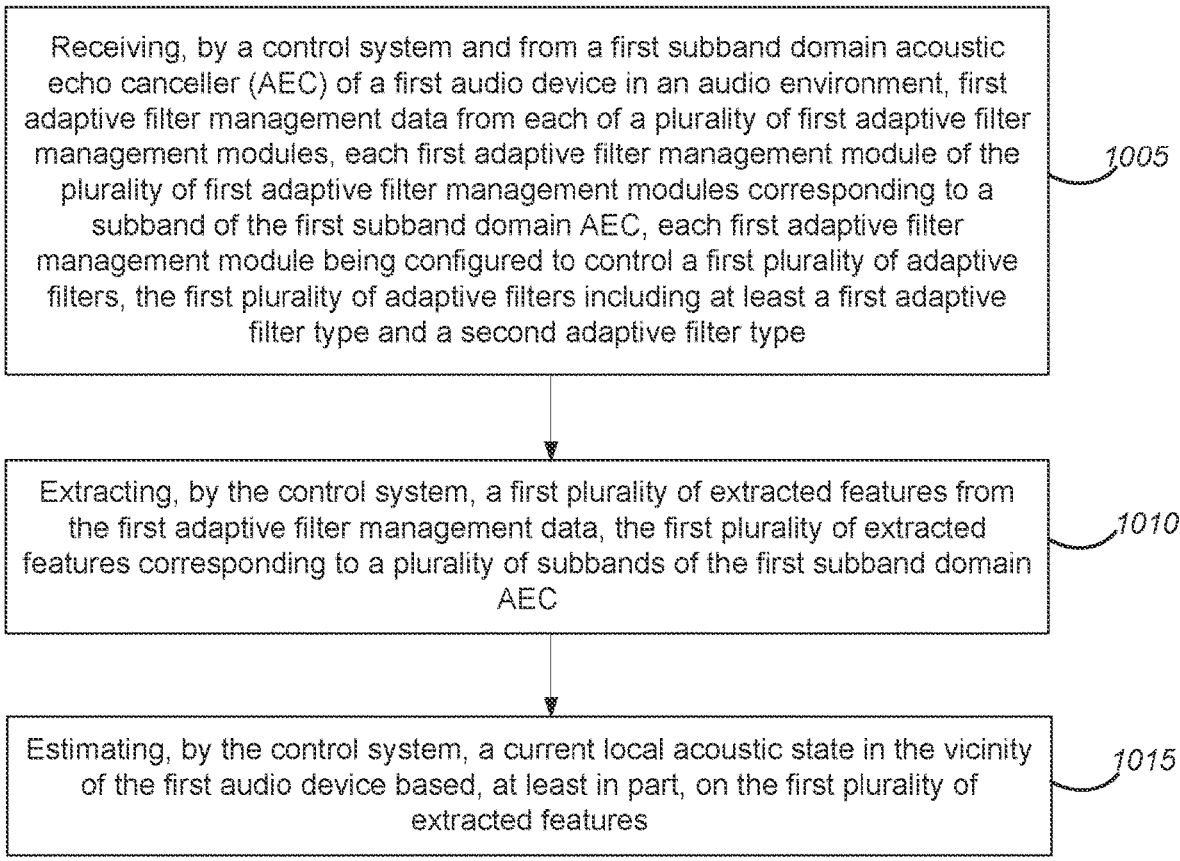
FIG. 10 is a flow diagram that outlines one example of a disclosed method.

FIG. 10 is a flow diagram that outlines one example of a disclosed method. The blocks of method 1000, like other methods described herein, are not necessarily performed in the order indicated. Moreover, such methods may include more or fewer blocks than shown and/or described. In this example, method 1000 is an audio processing method.

The method 1000 may be performed by an apparatus or system, such as the apparatus 150 that is shown in FIG. 1B and described above. In some examples, the blocks of method 1000 may be performed by one or more devices within an audio environment, e.g., by an audio system controller (such as what is referred to herein as a smart home hub) or by another component of an audio system, such as a smart speaker, a television, a television control module, a laptop computer, a mobile device (such as a cellular telephone), etc. In some implementations, the audio environment may include one or more rooms of a home environment. In other examples, the audio environment may be another type of environment, such as an office environment, an automobile environment, a train environment, a street or sidewalk environment, a park environment, etc. However, in alternative implementations at least some blocks of the method 1000 may be performed by a device that implements a cloud-based service, such as a server.

In this implementation, block 1005 involves receiving, by a control system and from a first subband domain acoustic echo canceller (AEC) of a first audio device in an audio environment, first adaptive filter management data from each of a plurality of first adaptive filter management modules. In this example, each first adaptive filter management module of the plurality of first adaptive filter management modules corresponds to a subband of the first subband domain AEC.

Moreover, in this implementation each first adaptive filter management module is configured to control a first plurality of adaptive filters. According to this example, the first plurality of adaptive filters includes at least a first adaptive filter type and a second adaptive filter type. In some implementations, the first adaptive filter type may be relatively more aggressive than the second adaptive filter type. According to some implementations, the first adaptive filter type may be a main adaptive filter and the second adaptive filter may be a shadow adaptive filter.

In this example, block 1010 involves extracting, by the control system, a first plurality of extracted features from the first adaptive filter management data. According to this implementation, the first plurality of extracted features corresponds to a plurality of subbands of the first subband domain AEC.

In this implementation, block 1015 involves estimating, by the control system, a current local acoustic state in the vicinity of the first audio device based, at least in part, on the first plurality of extracted features. In some implementations, method 1000 may involve controlling one or more types of audio processing based, at least in part, on the current local acoustic state. According to some such examples, controlling the one or more types of audio processing may involve controlling audio processing for audio data to be reproduced in the audio environment. In some such examples, method 1000 may involve reproducing the audio data via one or more loudspeakers of the audio environment.

Alternatively, or additionally, controlling the one or more types of audio processing may involve controlling automatic speech recognition processing, e.g., automatic speech recognition processing that is implemented, at least in part, by one or more audio devices (such as smart speakers) of the audio environment. In some such examples, method 1000 may involve controlling one or more loudspeakers, microphones or other devices of the audio environment according to voice commands interpreted via such automatic speech recognition processing.

Alternatively, or additionally, controlling the one or more types of audio processing may involve controlling acoustic echo canceller functionality (e.g., controlling functionality of the first subband domain AEC) and/or controlling noise compensation processing in the audio environment. In some such examples, method 1000 may involve controlling the level of audio data reproduced via one or more loudspeakers of the audio environment. In some examples, method 1000 may involve controlling the rendering of audio data reproduced via one or more loudspeakers of the audio environment.

In some examples, the current local acoustic state may include a doubletalk state in which both speech and reproduced audio data are present in the vicinity of the first audio device. In some instances, the current local acoustic state may include an echo path change in the vicinity of the first audio device. Alternatively, or additionally, the current local acoustic state may involve a change of a location of the first audio device, a change one or more settings of the first audio device, a change of a configuration of an audio system that includes the first audio device, and/or a level of background noise.

According to some implementations, the first plurality of extracted features may include one or more of the following: a probability of the first adaptive filter type producing a lowest residual power; a probability of the second adaptive filter type producing the lowest residual power; a probability of an input microphone power being lower than a first residual produced via the first adaptive filter type or a second residual produced via the second adaptive filter type; a rate at which first filter coefficients of the first adaptive filter type are copied into adaptive filters of the second adaptive filter type; or a rate at which second filter coefficients of the second adaptive filter type are copied into adaptive filters of the first adaptive filter type.

In some implementations, the first plurality of adaptive filters may include at least first through $M^{th}$ adaptive filter types, M being an integer of 3 or more. According to some such implementations, the first plurality of extracted features may include one or more of the following: a probability of an $M^{th}$ adaptive filter type producing a lowest residual power; a probability of any one of the second through $(M-1)^{th}$ adaptive filter types producing the lowest residual power; a probability of an input microphone power being lower than a residual produced via any one of the first through $M^{th}$ adaptive filter types; and a rate at which filter coefficients of any one of the first through $M^{th}$ adaptive filter types are copied into adaptive filters of any other one of the first through $M^{th}$ adaptive filter types.

According to some implementations, method 1000 may involve receiving, from second through $N^{th}$ subband domain AECs of second through $N^{th}$ audio devices in the audio environment, second through $N^{th}$ adaptive filter management data from each of second through $N^{th}$ pluralities of adaptive filter management modules, N being an integer greater than 2. In some such examples, each of the second through $N^{th}$ pluralities of adaptive filter management modules may correspond to one of the second through $N^{th}$ audio devices.

In some such implementations, method 1000 may involve extracting second through $N^{th}$ pluralities of extracted features from the second through $N^{th}$ adaptive filter management data. In some such implementations, method 1000 may involve estimating a current global acoustic state in the audio environment based, at least in part, on the first plurality of extracted features and the second through $N^{th}$ pluralities of extracted features. In some alternative implementations, method 1000 may involve estimating a current global acoustic state in the audio environment based on input from only a single audio device of the audio environment. In some implementations, method 1000 may involve estimating a current global acoustic state in the audio environment based on input from only two audio devices of the audio environment.

According to some such implementations, method 1000 may involve controlling one or more types of audio processing based, at least in part, on the current global acoustic state. In some such examples, controlling one or more types of audio processing for audio data based, at least in part, on the current global acoustic state may involve controlling one or more types of audio processing for audio data to be reproduced in the audio environment.

In some instances, the current global acoustic state may be, or may include, a conversational mode in which both speech and reproduced audio data are present in the vicinity of multiple audio devices of the audio environment. According to some such examples, controlling one or more types of audio processing may involve causing audio data to be reproduced at a lower level than a detected level of conversational sound.

According to some implementations, the first adaptive filter management data does not include individual filter coefficient values. In some examples, the first adaptive filter management data does not include residual output of the first subband domain AEC.

Figure 11:
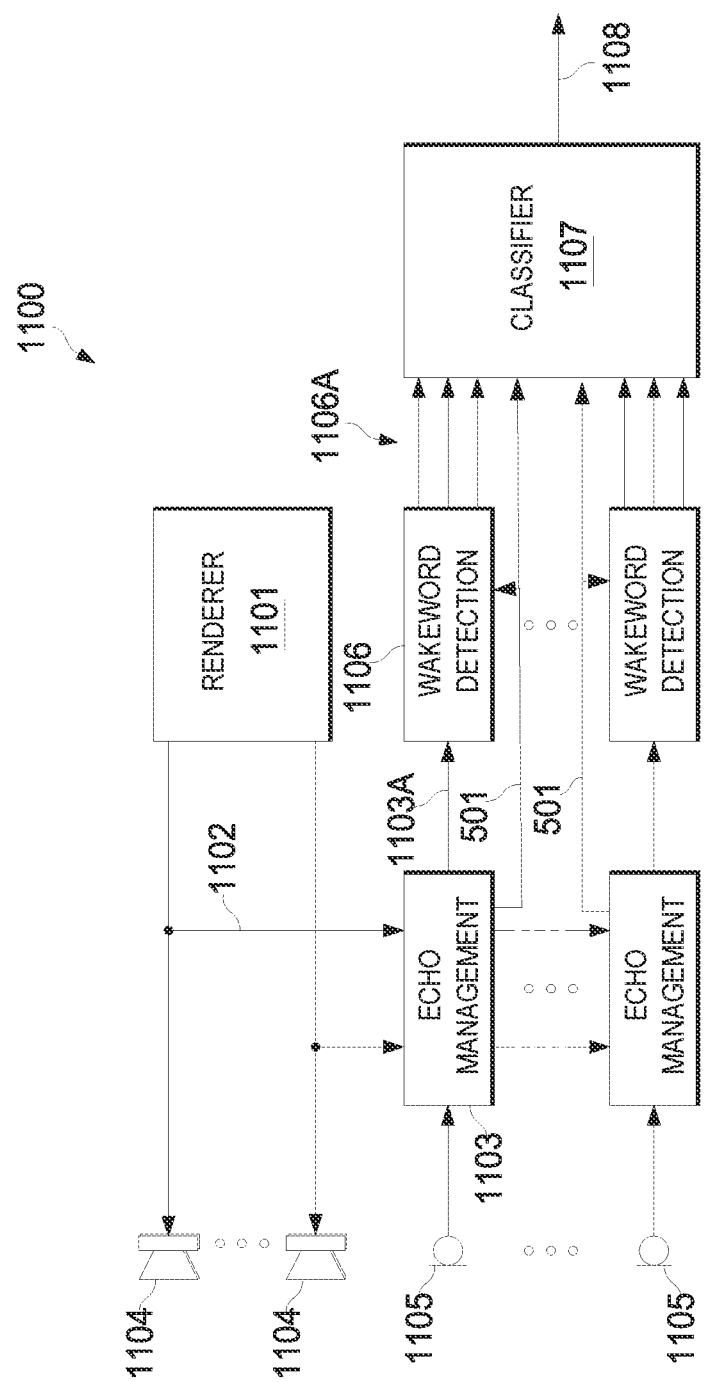
FIG. 11 is a block diagram of elements of one example of an embodiment that is configured to implement a zone classifier.

FIG. 11 is a block diagram of elements of one example of an embodiment that is configured to implement a zone classifier. According to this example, system 1100 includes a plurality of loudspeakers 1104 distributed in at least a portion of an audio environment. In this example, the system 1100 includes a multichannel loudspeaker renderer 1101. According to this implementation, the outputs of the multichannel loudspeaker renderer 1101 serve as both loudspeaker driving signals (speaker feeds for driving speakers 1104) and echo references. In this implementation, the echo references are provided to echo management subsystems 1103 via a plurality of loudspeaker reference channels 1102, which include at least some of the speaker feed signals output from renderer 1102.

In this implementation, the system 1100 includes a plurality of echo management subsystems 1103. According to this example, the echo management subsystems 1103 are configured to implement one or more echo suppression processes and/or one or more echo cancellation processes. In this example, each of the echo management subsystems 1103 provides a corresponding echo management output 1103A to one of the wakeword detectors 1106. The echo management output 1103A has attenuated echo relative to the input to the relevant one of the echo management subsystems 1103. In this example, each of the echo management subsystems 1103 also provides extracted features 501 to one of the wakeword detectors 1106 and to the classifier 1107. The types of extracted features 501 that are provided to the wakeword detectors 1106 and to the classifier 1107 may vary according to the particular implementation. According to some implementations, the extracted features 501 that are provided to the wakeword detectors 1106 and to the classifier 1107 may include features suitable for estimating the locations, movement, etc., of one or more people in the audio environment, e.g., on an acoustic zone level.

According to this implementation, the system 1100 includes N microphones 1105 (N being an integer) distributed in at least a portion of the environment (e.g., the environment illustrated in FIG. 1A or FIG. 1B). The microphones may include array microphones and/or spot microphones. For example, one or more smart audio devices located in the environment may include an array of microphones. In this example, the outputs of microphones 1105 are provided as input to the echo management subsystems 1103. According to this implementation, each of echo management subsystems 1103 captures the output of an individual microphone 1105 or an individual group or subset of the microphones 1105).

In this example, the system 1100 includes a plurality of wakeword detectors 1106. According to this example, each of the wakeword detectors 1106 receives the audio output from one of the echo management subsystems 1103 and outputs a plurality of acoustic features 1106A. The acoustic features 1106A output from each echo management subsystem 1103 may include (but are not limited to): wakeword confidence, wakeword duration and measures of received level. Although three arrows, depicting three acoustic features 1106A, are shown as being output from each echo management subsystem 1103, more or fewer acoustic features 1106A may be output in alternative implementations. Moreover, although these three arrows are impinging on the classifier 1107 along a more or less vertical line, this does not indicate that the classifier 1107 necessarily receives the acoustic features 1106A from all of the wakeword detectors 1106 at the same time. As noted elsewhere herein, the acoustic features 1106A may, in some instances, be determined and/or provided to the classifier asynchronously.

According to this implementation, the system 1100 includes a zone classifier 1107, which may also be referred to as a classifier 1107. In this example, the classifier receives the plurality of features 1106A from the plurality of wakeword detectors 1106 for a plurality of (e.g., all of) the microphones 1105 in the environment. According to this example, the output 1108 of the zone classifier 1107 corresponds to an estimate of the user zone in which the user is currently located. According to some such examples, the output 1108 may correspond to one or more posterior probabilities. An estimate of the user zone in which the user is currently located may be, or may correspond to, a maximum a posteriori probability according to Bayesian statistics.

We next describe example implementations of a classifier, which may in some examples correspond with the zone classifier 1107 of FIG. 11. Let $x_i(n)$ be the ith microphone signal, $i=\{1 \ldots N\}$, at discrete time n (i.e., the microphone signals $x_i(n)$ are the outputs of the N microphones 1105). Processing of the N signals $x_i(n)$ in echo management subsystems 1103 generates 'clean' microphone signals $e_i(n)$, where $i=\{1 \ldots N\}$, each at a discrete time n. Clean signals $e_i(n)$, referred to as 1103A in FIG. 11, are fed to wakeword detectors 1106 in this example. Here, each wakeword detector 1106 produces a vector of features $w_i(j)$, referred to as 1106A in FIG. 11, where $j=\{1 \ldots J\}$ is an index corresponding to the jth wakeword utterance. In this example, the classifier 1107 takes as input an aggregate feature set $W(j)=[w_1^T(j) \ldots w_N^T(j)]^T$.

According to some implementations, a set of zone labels $C_k$, for $k=\{1 \ldots K\}$, may correspond to a number, K, of different user zones in an environment. For example, the user zones may include a couch zone, a kitchen zone, a reading chair zone, etc. Some examples may define more than one zone within a kitchen or other room. For example, a kitchen area may include a sink zone, a food preparation zone, a refrigerator zone and a dining zone. Similarly, a living room area may include a couch zone, a television zone, a reading chair zone, one or more doorway zones, etc. The zone labels for these zones may be selectable by a user, e.g., during a training phase.

In some implementations, classifier 1107 estimates posterior probabilities $p(C_k|W(j))$ of the feature set W(j), for example by using a Bayesian classifier. Probabilities $p(C_k|W(j))$ indicate a probability (for the "j"th utterance and the "k"th zone, for each of the zones $C_k$, and each of the utterances) that the user is in each of the zones $C_k$, and are an example of output 1108 of classifier 1107.

According to some examples, training data may be gathered (e.g., for each user zone) by prompting a user to select or define a zone, e.g., a couch zone. The training process may involve prompting the user make a training utterance, such as a wakeword, in the vicinity of a selected or defined zone. In a couch zone example, the training process may involve prompting the user to make the training utterance at the center and extreme edges of a couch. The training process may involve prompting the user to repeat the training utterance several times at each location within the user zone. The user may then be prompted to move to another user zone and to continue until all designated user zones have been covered.

Because some aspects of the present disclosure involve detecting and distinguishing changes in the acoustic state that correspond to a nearby person, in some examples an audio device may gracefully make itself known with a reciprocal illumination of an LED light or other visual indicator. In some examples, this kind of visual feedback may be available before a person addresses the audio device with a wakeword. In some instances, such feedback may include not only a subtle visual indication, but also controlling the playback and/or capture processing onboard the audio device may be applied in anticipation of a wakeword utterance, in order to better process the person's anticipated speech.

It is known to configure a smart audio device in a discrete physical zone to detect a user (who has uttered a wakeword that has been detected by the device), and to respond to the wakeword by transmitting a visual signal and/or an auditory signal which can be seen or heard by a user in the zone. Some disclosed embodiments implement a departure from this known approach by configuring one or more smart audio devices (of a system) to consider a user's position as uncertain (within some volume, or area, of uncertainty), and by using all available smart audio devices within the volume (or area) of uncertainty to provide a spatially-varying expression of "attentiveness" of the system through one or more (e.g., all) states or operating modes of the devices. In some embodiments, the goal is not to pick the single closest device to the user and override its current setting, but to modulate behavior of all the devices according to a relevance metric, which may in some examples be based at least in part on a device's estimated proximity to the user. This gives the sense of a system which is focusing its attention on a localized area, eliminating the jarring experience of a distant device indicating that the system is listening when the user is attempting to get the attention of a closer one of the devices. According to some examples, the relevance metric may be based, at least in part, on the estimated local acoustic state information 226A and/or the current global acoustic state estimation 227 that is described above.

Some embodiments provide (or are configured to provide) a coordinated utilization of all the smart audio devices in an environment or in a zone of the environment, by defining and implementing the ability of each device to generate an attentiveness signal (e.g., in response to a wakeword). In some implementations, some or all of the devices may be configured to "mix in" the attentiveness signal into a current configuration (and/or to generate the attentiveness signal to be at least partially determined by the current configurations of all the devices). In some implementations, each device may be configured to determine a probabilistic estimate of a distance from a location, such as the device's distance from the user's position. Some such implementations may provide a cohesive, orchestrated expression of the system's behavior in a way that is perceptually relevant to the user.

For a smart audio device which includes (or is coupled to) at least one speaker, the attentiveness signal may be sound emitted from at least one such speaker. Alternatively, or additionally, the attentiveness signal may be of some other type (e.g., light). In some example, the attentiveness signal may be or include two or more components (e.g., emitted sound and light).

According to some examples, the attentiveness signals may include a modulation of at least one previous signal generated by a device within the zone prior to a time of the utterance. For example, if a light fixture or a light source system had previously been emitting light signals the modulation may be a color modulation, a color saturation modulation and/or a light intensity modulation. If the previous signal had been a sound signal, the modulation may have included a level or volume modulation, a frequency modulation, etc. In some examples, the modulation may be a change of a fan speed, a change of a flame size, a change of a motor speed and/or a change of an air flow rate.

According to some implementations the modulation may be a "swell." The swell may be, or may include, a predetermined sequence of signal modulations. In some instances, a swell may include a distinct envelope of attentiveness signal modulations. A swell may be designed to provide a timing of attentiveness signal modulations that reflects a natural cadence of attention (or attentiveness). The trajectory of a swell is sometimes designed to avoid any sense of abrupt change at the edge points, e.g., at the beginning and end of the swell. A swell envelope may, for example, include an attack, which is an attentiveness signal level increase from a baseline level to a local maximum level during a first time interval. The local maximum level may vary according to the type of attentiveness signal (e.g., whether light, sound or other), how the signal will be modulated (e.g., light intensity, color or color saturation change) and whether the attentiveness signal is intended to correspond to a "detectable" or "commanded" condition. In other examples, the first time interval of the swell may correspond to an attentiveness signal level decrease from a baseline level to a local minimum level.

Some such implementations may involve the use of variable output devices (which may, in some instances, be continuously variable output devices) in the system environment (e.g., the lights, speakers, fans, fireplace, etc., of a living space) that may be used for another purpose but are able to be modulated around their current operating point. Some examples may provide variable attentiveness indication(s) (e.g., varying attentiveness signals which have a swell), for example to indicate a varying expression (e.g., a varying amount) of attention across a set of devices. Some implementations may be configured to control variable attentiveness signal(s) (e.g., a swell) based on a function of estimated intensity of user signaling and/or confidence of user location(s).

Figure 12:
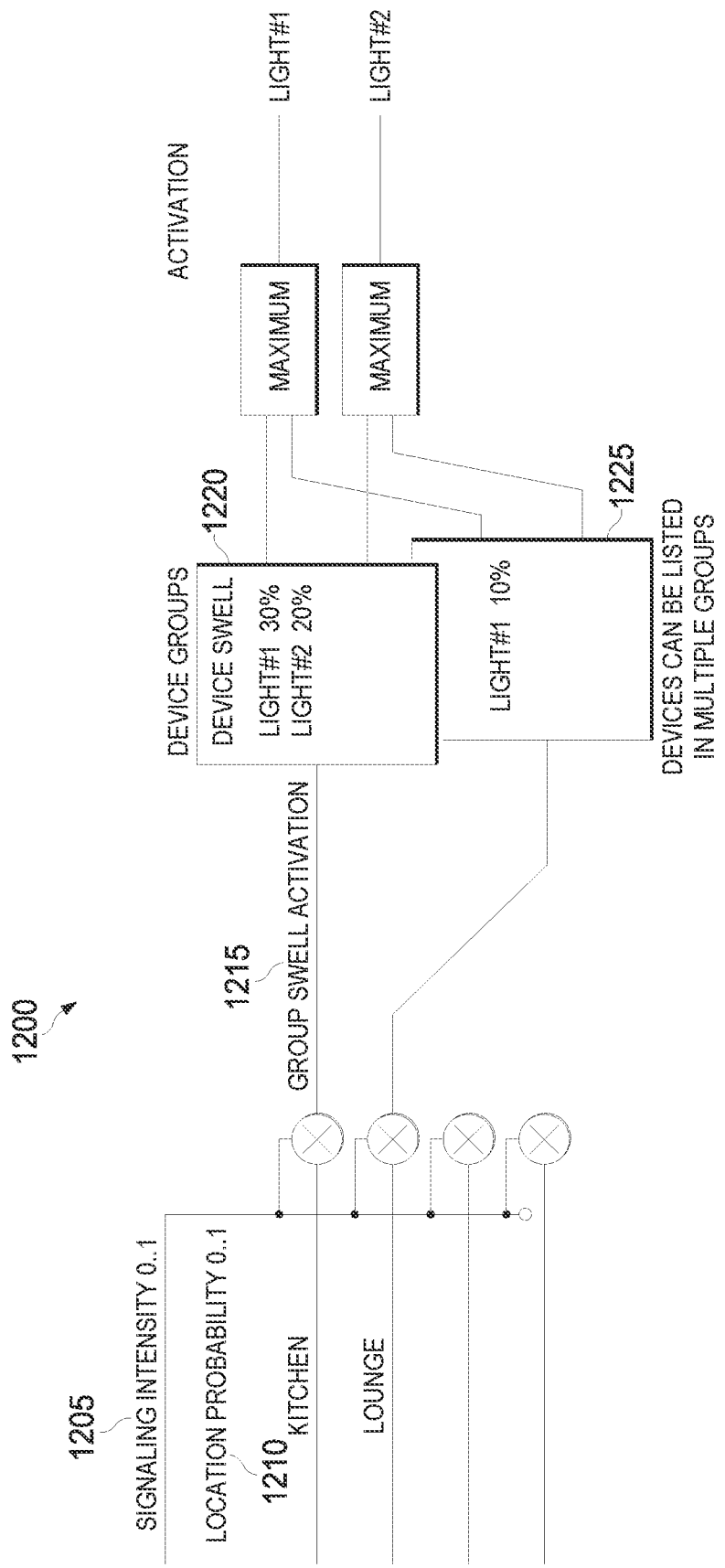
FIG. 12 is a block diagram showing examples of attentiveness expression features according to some implementations.

FIG. 12 is a block diagram showing examples of attentiveness expression features according to some implementations. In this example, FIG. 12 indicates variable signaling intensity 1205 (e.g., of a wakeword uttered by a user), and variable probability of location 1210 of the source of the variable signal. FIG. 12 also indicates responses to the variable signaling of different smart audio devices (e.g., virtual assistants). The devices are in device groups 1220 and 1225, and they include or are associated with (e.g., are configured for communication with) activatable lights. As indicated in FIG. 12, each of the devices can be included in different groups. The "device groups" of FIG. 12 are based on a corresponding zone, such as lounge, kitchen, etc. It's possible that one zone may contain multiple audio devices and/or lights. Zones can overlap, so any audio device, light, etc. may be in multiple zones. Accordingly, lights, audio devices, etc., may be associated with zones instead of, or in addition to, being associated with devices. Certain lights, audio devices, etc., may be more strongly (or more weakly) associated with each zone and therefore may be associated with different swell percentages. The swell percentages may, in some examples, correspond to relevance metrics. In some implementations these relevance metrics may be manually set up and captured in a table, e.g., as shown in FIG. 12. In other examples the relevance metrics may be automatically determined from distance heuristics or probabilities, e.g., as described above.

For example, in response to a wakeword (having determined intensity and having a location of origin which is determined with uncertainty), two different lights of, or associated with, the devices may be activated to produce time-varying attentiveness signals. Because in this example the attentiveness signals are based in part on an estimated distance between a device and the location of origin of the wakeword, which varies according to the location of each device, the attentiveness signals are also spatially-varying.

In the example shown in FIG. 12, the signaling intensity (1205) may correspond, for example, to the "wakeword confidence" discussed above. In this example, the location probabilities for all the zones (kitchen, lounge, etc.) 1210 correspond to the zone probabilities (e.g., in the range [0,1]) discussed above. FIG. 12 shows an example in which there is different behavior (which may correspond to "relevance metrics") of each light corresponding to each zone. If a light, an audio device, etc., is associated with multiple zones, in some implementations a control system may be configured to determine the maximum of the outputs of each of the relevant zones.

Figure 13:
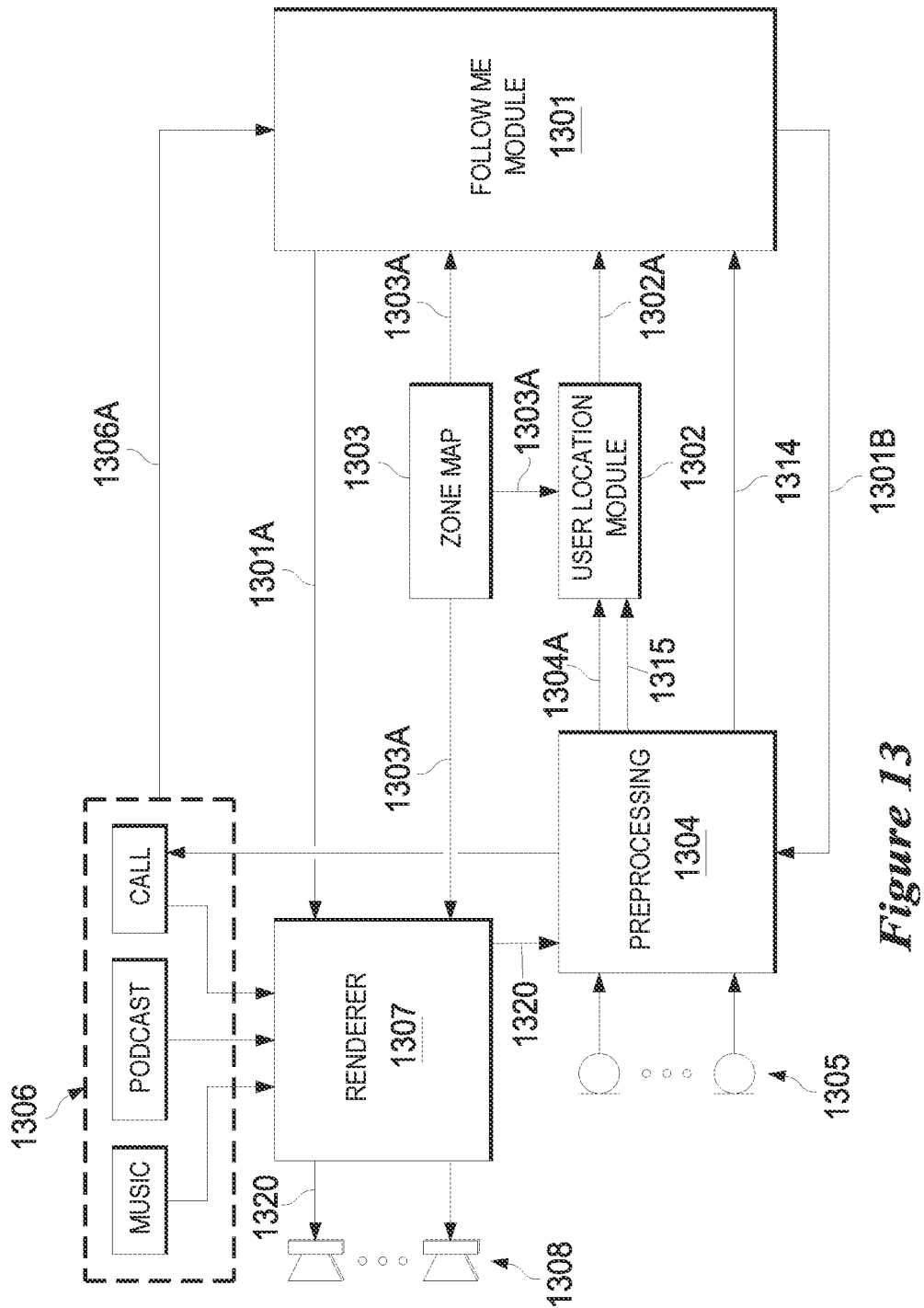
FIG. 13 is a block diagram of a system implemented in an environment (e.g., a home) in accordance with an implementation.

FIG. 13 is a block diagram of a system implemented in an environment (e.g., a home) in accordance with an implementation. The system implements a "follow me" mechanism to track user location. In FIG. 13, the labeled elements are:

1301: subsystem (sometimes referred to as a module or "follow me" module) configured to take inputs and make decisions (in response to the inputs) about best microphones and loudspeakers to use for a determined activity (e.g., indicated by input 1306A);

1301A: data indicative of a decision (determined in module 1301) as to best loudspeaker(s) of the system to use for the determined activity, and/or the zone (e.g., one of the zones indicated by zone map 1303) in which a user (e.g., a talker) is currently located;

1301B: data indicative of a decision (determined in module 1301) as to best microphone(s) of the system to use for the determined activity, and/or the zone (e.g., one of the zones indicated by zone map 1303) in which the user is currently located;

1302: User location subsystem (module), configured to determine location of the user (e.g., a talker), e.g., within a zone of the environment. In some implementations, subsystem 1302 is configured to estimate a user's zone (e.g., according to multiple acoustic features derived from at least some of the microphones 1305). In some such implementations, the goal is not to estimate the user's exact geometric location but to form a robust estimate of a discrete zone (e.g., in the presence of heavy noise and residual echo) in which the user is located;

1302A: Information (data) indicative of current location of the user (talker), determined by module 1302 and asserted to module 1301;

1303: Zone map subsystem, providing a zone map indicative of zones of the environment of the system and a list of all microphones and loudspeakers of the system grouped by their locations in the zones. In some implementations, subsystem 1303 is or includes a memory which stores data indicative of the zone map;

1303A: Information (data) about at least one zone (of the zone map) and the plurality of microphones and loudspeakers contained in each such zone (e.g., each of at least a subset of the zones) of the zone map, asserted (in some implementations of the system) to module 1301 and/or to module 1302;

1304: Preprocessing subsystem, coupled and configured to perform preprocessing of the outputs of microphones 1305. Subsystem 1304 may implement one or more microphone preprocessing subsystems (e.g., a feature extraction subsystem, an acoustic state estimation subsystem, an echo management subsystem, a wakeword detector, and/or a speech recognition subsystem, etc.);

1304A: preprocessed microphone signal(s) generated by, and output from, subsystem 1304;

1315: Extracted features and/or acoustic state information generated by, and output from, preprocessing subsystem 1304. The output 1315 may, for example, correspond to the extracted features 501, the extracted features 601, the estimated local acoustic state information 226 and/or the global acoustic state information 627 that are described above;

1305: Plurality of microphones;

1306: subsystem coupled and configured to implement at least one current audio activity (e.g., a plurality of current ongoing audio activities). Each such audio activity (sometimes referred to herein as an "activity" for convenience) includes detection of sound (using at least one microphone) and/or production of sound (by emitting the sound from at least one loudspeaker). Examples of such audio activities include, but are not limited to, music playback (e.g., including a step of providing audio for rendering by subsystem 1307), a podcast (e.g., including a step of providing audio for rendering by subsystem 1307), and/or a phone call (e.g., including providing teleconference audio for rendering by subsystem 1307, and processing and/or transmitting each microphone signal provided to subsystem 1304);

1306A: Information (data) about the current ongoing activity or activities implemented by subsystem 1306, which is generated by subsystem 1306 and asserted from subsystem 1306 to module 1301;

1307: Multichannel loudspeaker renderer subsystem, coupled and configured to render audio (e.g., by generating speaker feeds for driving speakers 1308) generated or otherwise provided during performance of at least one current activity of the system. In this example, subsystem 1307 provides renderer output 1320 to the speakers 1308 and to the preprocessing subsystem 1304. For example, subsystem 1307 may be implemented to render audio for playback by a subset of speakers 1308 (which may be implemented in or coupled to different smart audio devices) such that sound emitted by the relevant loudspeakers is perceivable (e.g., clearly, or in a best or desired manner) by the user, in the user's current location (e.g., zone), in accordance with data 1301A;

1308: Plurality of loudspeakers; and

1314: voice command(s) from a user (e.g., a talker), which is or are output from subsystem 1304 and provided to module 1301 in typical implementations of the system.

Elements 1301, 1302, and 1303 (or elements 1302 and 1303) may be referred to collectively as a user location and activity control subsystem of the FIG. 13 system.

Elements of the FIG. 13 system may be implemented in or coupled to smart audio devices. For example, all or some of loudspeakers 1308 and/or all or some of microphones 1305 may be implemented in or coupled to one or more smart audio devices, or at least some of the microphones and loudspeakers may be implemented in a Bluetooth device connected to a Bluetooth transmitter/receiver (e.g., smartphone). Also for example, one or more other elements (e.g., all or some of elements 1301, 1302, 1303, 1304, and 1306)

of the FIG. 13 system may be implemented in or coupled to smart audio devices. In such example implementations, the "follow me" module 1301 operates (and other system elements operate) to coordinate (orchestrate) the smart audio devices, by tracking user location in response to sound (uttered by a user) and detected by at least one microphone of the system. For example, such coordination includes coordination of rendering of sound to be emitted by element(s) of the system and/or processing of the output(s) of microphone(s) of the system, and/or at least one activity implemented by the system (e.g., by element 1306 of the system).

Typically, subsystems 1302 and 1303 are tightly integrated. Subsystem 1302 may receive outputs of all or some (e.g., two or more) of microphones 1305 (which may be implemented as asynchronous microphones in some examples). Subsystem 1302 may implement a classifier, which in some examples is implemented in a smart audio device of the system. In other examples, the classifier may be implemented by another type of device (e.g., a smart device which is not configured to provide audio) of the system which is coupled and configured for communication with the microphones. For example, at least some of microphones 1305 may be discrete microphones (e.g., in household appliances) which are not included in any smart audio device but which are configured for communication with a device which implements subsystem 1302 as a classifier, and the classifier may be configured to estimate a user's zone according to multiple acoustic features derived from the output signals of each microphone. In some such implementations, the goal is not to estimate the user's exact geometric location but to form a robust estimate of a discrete zone (e.g., in the presence of heavy noise and residual echo).

Herein, the expression "geometric location" (referred to in the previous and the following description) of an object, or a user, or a talker, in an environment, refers to a location based on a coordinate system (e.g., a coordinate system with reference to GPS coordinates), with reference to the system environment as a whole (e.g., according to a Cartesian or polar coordinate system having its origin somewhere within the environment) or with reference to a particular device (e.g., a smart audio device) within the environment (e.g., according to a Cartesian or polar coordinate system having the device as its origin). In some implementations, subsystem 1302 is configured to determine an estimate of a user's location in the environment without reference to geometric locations of microphones 1305.

"Follow me" module 1301 is coupled and configured to operate in response to a number of inputs (one or more of 1302A, 1303A, 1306A, and 1314), and to produce one or both of outputs 1301A and 1301B. Examples of the inputs are next described in more detail.

Input 1303A may be indicative of information regarding each zone of the zone map (sometimes referred to as acoustic zones), including but not limited to one or more of: a list of devices (e.g., smart devices, microphones, loudspeakers, etc.) of the system located within each zone, dimension(s) of each zone (e.g., in same coordinate system as geometric location units), geometric location of each zone (e.g., Kitchen, Living Room, Bedroom, Television Area, etc.) with respect to the environment and/or with respect to other zones, geometric location of each device of the system (e.g., with respect to their respective zones and/or with respect to other ones of the devices), and/or name of each zone.

Input 1302A may be or include real time information (data) regarding all or some of: the acoustic zone in which the user (talker) is located, the talker's geometric location within such zone, and for how long has the talker been in such zone. Input 1302A may also include a degree of confidence by user location module 1302 as to the accuracy or correctness of any of the information noted in the previous sentence, and/or a history of talker movement (e.g., within the past N hours, where the parameter N is configurable).

Input 1314 may be a voice command, or two or more voice commands, uttered by the user (talker), each of which has been detected by preprocessing subsystem 1304 (e.g., commands related or unrelated to the functionality of "follow me" module 1301).

Output 1301A of module 1301 is an instruction to rendering subsystem (renderer) 1307 to adapt processing according to the current (e.g., most recently determined) acoustic zone of the talker. Output 1301B of module 1301 is an instruction to preprocessing subsystem 1304 to adapt processing according to the current (e.g., most recently determined) acoustic zone of the talker.

Output 1301A may be indicative of the talker's geometric location with respect to the talker's current acoustic zone, as well as geometric location and distance of each of loudspeakers 1308 with respect to the talker, e.g., to cause renderer 1307 to perform rendering that is estimated to be optimal rendering for the relevant activity being implemented by the system. The optimal rendering may depend on the activity and the zone, and optionally also on the talker's previously determined (e.g., recorded) preferences. For example, if the activity is a movie, and the talker is in the living room, output 1301A may instruct renderer 1307 to play back the audio of the movie using as many loudspeakers as possible for a cinema-like experience. If the activity is music, or a podcast, and the talker is in the kitchen, or in the bedroom, output 1301A may instruct renderer 1307 to render the music with only the closest loudspeakers, for a more intimate experience.

Output 1301B may be indicative of a sorted list of some or all of microphones 1305 for use by subsystem 1304 (e.g., microphone(s) whose output(s) should not be ignored, and instead should be used (e.g., processed) by subsystem 1304), and the geometric location of each such microphone with respect to the user (talker). In some implementations, subsystem 1304 may process outputs of some or all of microphones 1305 in a manner determined by one or more of: distance of each microphone from the talker (as indicated by output 1301B); wakeword score for each microphone (e.g., likelihood that the microphone heard a wakeword uttered by the user) if available; signal to noise ratio of each microphone (e.g., how much louder is speech uttered by the talker with respect to environmental noise and/or audio playback captured from the microphone); or a combination of two or more of the foregoing. The wakeword scores and signal to noise ratios may be calculated by preprocessing subsystem 1304. In some applications, such as a phone call, subsystem 1304 may only use the output of a best one of microphones 1305 (as indicated by the list), or may implement beam forming with signals from a plurality of microphones from the list. To implement some applications, such as (for example) a distributed speech recognizer or a distributed wakeword detector, subsystem 1304 may use outputs of a plurality of the microphones 1305 (e.g., determined from a sorted list indicated by output 1301B, where the sorting may be, for example, in order of proximity to the user).

In some exemplary applications, subsystem 1304 (with modules 1301 and 1302) implements a microphone selection or adaptive beamforming scheme that attempts to pick up sound from the zone of the user more effectively (e.g., in order to better recognize a command that follows a wakeword), using (e.g., at least partially in response to) output 1301B. In such scenarios, module 1302 may use output 1304A of subsystem 1304 as feedback regarding the quality of user zone prediction to improve user zone determination in any of various was, including (but not limited to) the following:

- penalizing predictions that result in misrecognition of a voice command following a wakeword. E.g., a user zone prediction that results in the user cutting short a voice assistant's response to a command (e.g., by uttering a counter-command, such as for example, "Amanda, stop!") may be penalized;
- penalizing predictions that result in low confidence that a speech recognizer (implemented by subsystem 1304) has successfully recognized a command;
- penalizing predictions that result in failure of a second-pass wakeword detector (implemented by subsystem 1304) to retrospectively detect a wakeword with high confidence; and/or
- reinforcing predictions that result in highly confident recognition of a wakeword and/or correct recognition of a user voice command.

Figure 14:
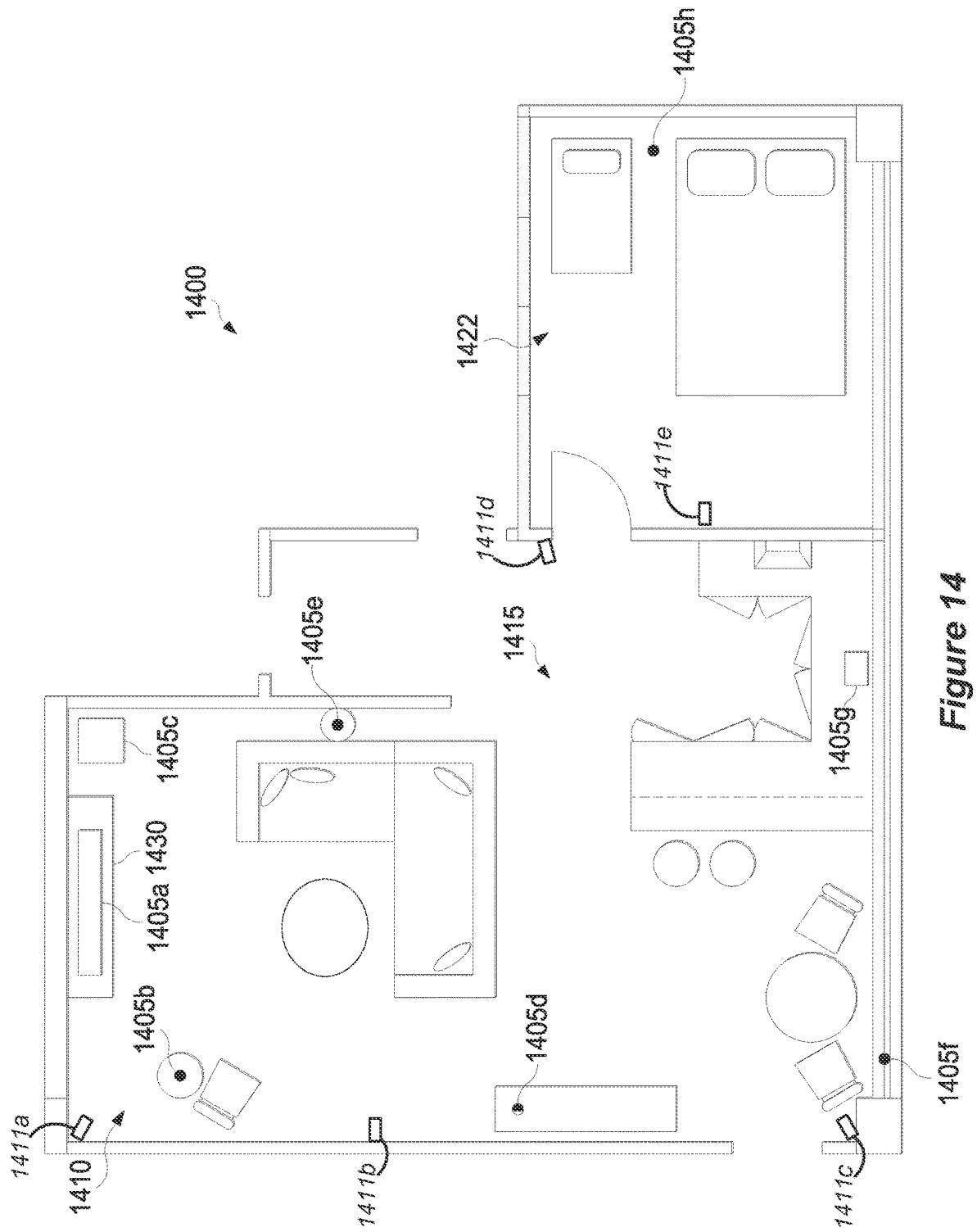
FIG. 14 shows an example of a floor plan of an audio environment, which is a living space in this example.

FIG. 14 shows an example of a floor plan of an audio environment, which is a living space in this example. As with other figures provided herein, the types and numbers of elements shown in FIG. 14 are merely provided by way of example. Other implementations may include more, fewer and/or different types and numbers of elements.

According to this example, the environment 1400 includes a living room 1410 at the upper left, a kitchen 1415 at the lower center, and a bedroom 1422 at the lower right. Boxes and circles distributed across the living space represent a set of loudspeakers 1405*a*-1405*h*, at least some of which may be smart speakers in some implementations, placed in locations convenient to the space, but not adhering to any standard prescribed layout (arbitrarily placed). In some examples, the television 1430 may be configured to implement one or more disclosed embodiments, at least in part. In this example, the environment 1400 includes cameras 1411*a*-1411*e*, which are distributed throughout the environment. In some implementations, one or more smart audio devices in the environment 1400 also may include one or more cameras. The one or more smart audio devices may be single purpose audio devices or virtual assistants. In some such examples, one or more cameras of the optional sensor system 130 may reside in or on the television 1430, in a mobile phone or in a smart speaker, such as one or more of the loudspeakers 1405*b*, 1405*d*, 1405*e* or 1405*h*. Although cameras 1411*a*-1411*e* are not shown in every depiction of the environment 1400 presented in this disclosure, each of the environments 1400 may nonetheless include one or more cameras in some implementations.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

Various aspects of the present invention may be appreciated from the following enumerated example embodiments (EEEs):

EEE1. An audio processing method, comprising:
receiving, by a control system and from a first subband domain acoustic echo canceller (AEC) of a first audio device in an audio environment, first adaptive filter management data from each of a plurality of first adaptive filter management modules, each first adaptive filter management module of the plurality of first adaptive filter management modules corresponding to a subband of the first subband domain AEC, each first adaptive filter management module being configured to control a first plurality of adaptive filters, the first plurality of adaptive filters including at least a first adaptive filter type and a second adaptive filter type;
extracting, by the control system, a first plurality of extracted features from the first adaptive filter management data, the first plurality of extracted features corresponding to a plurality of subbands of the first subband domain AEC; and
estimating, by the control system, a current local acoustic state in the vicinity of the first audio device based, at least in part, on the first plurality of extracted features.

EEE2. The method of EEE1, further comprising controlling one or more types of audio processing based, at least in part, on the current local acoustic state.

EEE3. The method of EEE 2, wherein controlling one or more types of audio processing involves controlling audio processing for audio data to be reproduced in the audio environment.

EEE4. The method of EEE 2 or EEE 3, wherein controlling one or more types of audio processing involves controlling automatic speech recognition processing.

EEE5. The method of any one of EEEs 2-4, wherein controlling one or more types of audio processing involves controlling noise compensation processing.

EEE6. The method of any one of EEEs 2-5, wherein controlling one or more types of audio processing involves controlling the first subband domain AEC.

EEE7. The method of any one of EEEs 1-6, wherein the current local acoustic state includes a doubletalk state in which both speech and reproduced audio data are present in the vicinity of the first audio device.

EEE8. The method of any one of EEEs 1-7, wherein the current local acoustic state includes an echo path change in the vicinity of the first audio device.

EEE9. The method of any one of EEEs 1-8, wherein the current local acoustic state includes one or more of a change of a location of the first audio device, a change one or more settings of the first audio device, a change of a configuration of an audio system that includes the first audio device, a level of playback audio, or a level of background noise.

EEE10. The method of any one of EEEs 1-9, wherein the first plurality of extracted features includes one or more of a rate at which first filter coefficients of the first adaptive filter type are copied into adaptive filters of the second adaptive filter type or a rate at which second filter coefficients of the second adaptive filter type are copied into adaptive filters of the first adaptive filter type.

EEE11. The method of any one of EEEs 1-9, wherein the first plurality of extracted features includes one or more features from a list of features consisting of: a probability of the first adaptive filter type producing a lowest residual power during a time interval; a probability of the second adaptive filter type producing the lowest residual power during the time interval; a probability of an input microphone power being lower than a first residual produced via the first adaptive filter type or a second residual produced via the second adaptive filter type during the time interval; a probability of the first adaptive filter type producing a lowest residual power in a plurality of subbands; a probability of the second adaptive filter type producing the lowest residual power in the plurality of subbands; a probability of an input microphone power being lower than a first residual produced via the first adaptive filter type or a second residual produced via the second adaptive filter type in the plurality of subbands.

EEE12. The method of any one of EEEs 1-11, wherein the first plurality of adaptive filters includes at least first through $M^{th}$ adaptive filter types, M being an integer of 3 or more.

EEE13. The method of EEE12, wherein the first plurality of extracted features includes one or more features from a list of features consisting of: a probability of an $M^{th}$ adaptive filter type producing a lowest residual power; a probability of any one of the second through $(M-1)^{th}$ adaptive filter types producing the lowest residual power; a probability of an input microphone power being lower than a residual produced via any one of the first through $M^{th}$ adaptive filter types; and a rate at which filter coefficients of any one of the first through $M^{th}$ adaptive filter types are copied into adaptive filters of any other one of the first through $M^{th}$ adaptive filter types.

EEE14. The method of any one of EEEs 1-13, further comprising:
receiving, from second through $N^{th}$ subband domain AECs of second through $N^{th}$ audio devices in the audio environment, second through $N^{th}$ adaptive filter management data from each of second through $N^{th}$ pluralities of adaptive filter management modules, each of the second through $N^{th}$ pluralities of adaptive filter management modules corresponding to one of the second through $N^{th}$ audio devices, N being an integer greater than 2;
extracting second through $N^{th}$ pluralities of extracted features from the second through $N^{th}$ adaptive filter management data; and
estimating a current global acoustic state in the audio environment based, at least in part, on the first plurality of extracted features and the second through $N^{th}$ pluralities of extracted features.

EEE15. The method of EEE14, further comprising controlling one or more types of audio processing based, at least in part, on the current global acoustic state.

EEE16. The method of EEE15, wherein controlling one or more types of audio processing for audio data based, at least in part, on the current global acoustic state involves controlling one or more types of audio processing for audio data to be reproduced in the audio environment.

EEE17. The method of any one of EEEs 1-16, wherein the method involves estimating a current global acoustic state, wherein the current global acoustic state includes a party state in which a plurality of people are in the audio environment and wherein controlling how audio data is rendered involves causing the audio data to be rendered according to a distributed rendering mode.

EEE18. The method of any one of EEEs 1-17, wherein the first adaptive filter type is relatively more aggressive than the second adaptive filter type.

EEE19. The method of any one of EEEs 1-18, wherein the first adaptive filter type is a linear adaptive filter type and the second adaptive filter type is a non-linear adaptive filter type.

EEE20. The method of any one of EEEs 1-19, wherein the first adaptive filter type is a main adaptive filter and the second adaptive filter type is a shadow adaptive filter.

EEE21. The method of any one of EEEs 1-20, wherein the first adaptive filter and the second adaptive filter are updated by different adaptive filtering algorithms.

EEE22. The method of any one of EEEs 1-21, wherein the first adaptive filter is comprised of a greater number of adapted filter coefficient values than the second adaptive filter.

EEE23. The method of any one of EEEs 1-22, wherein the first adaptive filter management data does not include individual filter coefficient values.

EEE24. The method of any one of EEEs 1-23, wherein the first adaptive filter management data does not include residual output of the first subband domain AEC.

EEE25. An apparatus configured to perform the method of any one of EEEs 1-24.

EEE26. A system configured to perform the method of any one of EEEs 1-24.

EEE27. One or more non-transitory media having software stored thereon, the software including instructions for controlling one or more devices to perform the method of any one of EEEs 1-24.

The invention claimed is:

1. An audio processing method, comprising:
receiving, from a first subband domain acoustic echo canceller (AEC) of a first audio device in an audio environment, first adaptive filter management data from each of a plurality of first adaptive filter management modules, each first adaptive filter management module of the plurality of first adaptive filter management modules corresponding to a subband of the first subband domain AEC, each first adaptive filter management module being configured to control a first plurality of adaptive filters, the first plurality of adaptive filters including at least a first adaptive filter type and a second adaptive filter type, wherein each adaptive filter of the first plurality of adaptive filters is used to produce an echo-canceled signal for the respective subband;
extracting, a first plurality of extracted features from the first adaptive filter management data, the first plurality of extracted features corresponding to a plurality of subbands of the first subband domain AEC; and
estimating, a current local acoustic state in a vicinity of the first audio device based, at least in part, on the first plurality of extracted features,
wherein the first plurality of extracted features includes one or more features from a list of features consisting of:
a probability of the echo-canceled signal produced via the first adaptive filter type having lowest power in the plurality of subbands;
a probability of the echo-canceled signal produced via the second adaptive filter type having lowest power in the plurality of subbands;
a probability of an input microphone power being lower than the power of the echo-canceled signal produced via any one of the first plurality of adaptive filters.

2. The method of claim 1, further comprising controlling one or more types of audio processing based, at least in part, on the current local acoustic state.

3. The method of claim 2, wherein controlling one or more types of audio processing involves controlling audio processing for audio data to be reproduced in the audio environment.

4. The method of claim 2, wherein controlling one or more types of audio processing involves controlling automatic speech recognition processing, controlling noise compensation processing, controlling the first subband domain AEC, or combinations thereof.

5. The method of claim 1, wherein the current local acoustic state includes at least one of a doubletalk state in which both speech and reproduced audio data are present in the vicinity of the first audio device or an echo path change in the vicinity of the first audio device.

6. The method of claim 1, wherein the current local acoustic state includes one or more of a change of a location of the first audio device, a change one or more settings of the first audio device, a change of a configuration of an audio system that includes the first audio device, a level of playback audio, or a level of background noise.

7. The method of claim 1, wherein the first plurality of extracted features includes one or more of a rate at which first filter coefficients of the first adaptive filter type are copied into adaptive filters of the second adaptive filter type or a rate at which second filter coefficients of the second adaptive filter type are copied into adaptive filters of the first adaptive filter type.

8. The method of claim 1, wherein the first plurality of adaptive filters includes at least first through $M^{th}$ adaptive filter types, M being an integer of 3 or more and wherein the first plurality of extracted features includes one or more features from a list of features consisting of:
a probability of the echo-canceled signal produced via an $M^{th}$ adaptive filter type having lowest power;
a probability of the echo-canceled signal produced via any one of second through $(M-1)^{th}$ adaptive filter types having lowest power;
a probability of an input microphone power being lower than the power of an echo-canceled signal produced via any one of the first through $M^{th}$ adaptive filter types; and a rate at which filter coefficients of any one of the first through $M^{th}$ adaptive filter types are copied into adaptive filters of any other one of the first through $M^{th}$ adaptive filter types.

9. The method of claim 1, further comprising:
receiving, from second through $N^{th}$ subband domain AECs of second through $N^{th}$ audio devices in the audio environment, second through $N^{th}$ adaptive filter management data from each of second through $N^{th}$ pluralities of adaptive filter management modules, each of the second through $N^{th}$ pluralities of adaptive filter management modules corresponding to one of the second through $N^{th}$ audio devices, N being an integer greater than 2;
extracting second through $N^{th}$ pluralities of extracted features from the second through $N^{th}$ adaptive filter management data;
estimating a current global acoustic state in the audio environment based, at least in part, on the first plurality of extracted features and the second through $N^{th}$ pluralities of extracted features; and
controlling one or more types of audio processing based, at least in part, on the current global acoustic state.

10. The method of claim 1, wherein the first adaptive filter type is a linear adaptive filter type and the second adaptive filter type is a non-linear adaptive filter type.

11. The method of claim 1, wherein the first adaptive filter type and the second adaptive filter type are updated by different adaptive filtering algorithms.

12. The method of claim 1, wherein the first adaptive filter management data does not include individual filter coefficient values.

13. The method of claim 1, wherein the first adaptive filter management data does not include an output of the first subband domain AEC, wherein the output of the first subband domain AEC is a full-band echo-cancelled signal generated from subband domain echo-canceled signals output by the plurality of first adaptive filter management modules.

14. An apparatus comprising an interface system and a control system wherein the apparatus is configured to perform the method of claim 1.

15. One or more non-transitory media comprising a memory device having software stored thereon, the software including instructions used by a processor for controlling one or more devices to perform the method of claim 1.

* * * * *